US009411658B2

(12) United States Patent
Desai et al.

(10) Patent No.: US 9,411,658 B2
(45) Date of Patent: Aug. 9, 2016

(54) TOKEN-BASED ADAPTIVE TASK MANAGEMENT FOR VIRTUAL MACHINES

(71) Applicant: VMware, Inc., Palo Alto, CA (US)

(72) Inventors: Aalap Desai, Sunnyvale, CA (US); Chirag Bhatt, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 456 days.

(21) Appl. No.: 13/772,556

(22) Filed: Feb. 21, 2013

(65) Prior Publication Data
US 2014/0237468 A1 Aug. 21, 2014

(51) Int. Cl.
*G06F 9/46* (2006.01)
*G06F 9/50* (2006.01)

(52) U.S. Cl.
CPC ............ *G06F 9/5083* (2013.01); *G06F 9/5077* (2013.01)

(58) Field of Classification Search
None
See application file for complete search history.

(56) References Cited

U.S. PATENT DOCUMENTS

| 7,415,519 | B2 | 8/2008 | Abbondanzio et al. | |
| 8,953,453 | B1* | 2/2015 | Xiao et al. | 370/235.1 |
| 2005/0283534 | A1* | 12/2005 | Bigagli et al. | 709/229 |
| 2014/0181833 | A1* | 6/2014 | Bird et al. | 718/105 |

OTHER PUBLICATIONS

Gulati et al, Efficient and Adaptive Proportional Share I/O Scheduling, HP, Nov. 2007, 13 pages.*

Li et al, vATM: vSphere Adaptive Task Management, Stoney Brook University and VMware, Inc, 2012, pp. 1-6.*

Xu et al., "Online System Problem Detection by Mining Patterns of Console Logs", IEEE International Conference on Data Mining, 2009, 10 pages.

Liu et al., "Online Response Time Optimization of Apache Web Server", International Workshop on Quality of Service, 2003, 10 pages.

Diao et al., "Generic Online Optimization of Multiple Configuration Parameters with Application to a Database Server", IFIP/IEEE International Workshop on Distributed Systems: Operations and Management, 2003, 12 pages.

Soundararajan et al., "The Impact of Management Operations on the Virtualized Datacenter", ACM International Symposium on Computer Architecture, 2010, 12 pages.

Abdelzaher et al., "Feedback Performance Control in Software Services", IEEE Control Systems Magazine, 2003, 17 pages.

Diniz et al., "Dynamic Feedback: An Effective Technique for Adaptive Computing", ACM SIGPLAN Notices, 1997, 14 pages.

Unknown, "VMware vCloud Suite", <<http://www.vmware.com/products/datacenter-virtualization/vcloud-suite/overview.html>>, accessed Feb. 20, 2013, 2 pages.

Unknown, "VMware vCenter Site Recovery Manager", <<http://www.vmware.com/products/site-recovery-manager/overview.html>>, accessed Feb. 20, 2013, 2 pages.

Unknown, "VMware vCloud Director", <<http://www.vmware.com/products/vcloud-director/overview.html>>, accessed Feb. 20, 2013, 3 pages.

(Continued)

*Primary Examiner* — Diem Cao

(57) ABSTRACT

Embodiments perform adaptive throttling of tasks into a virtual datacenter having dynamically changing resources. Tasks are processed concurrently in batches. The rate of change in throughput at different batch sizes is calculated. With each iteration, the batch size is increased or decreased based on the rate of change to achieve a maximum throughput for given resources and load on the virtual datacenter.

18 Claims, 23 Drawing Sheets

(56) References Cited

OTHER PUBLICATIONS

Unknown, "Virtual Desktop Infrastructure", <<http://www.vmware.com/pdf/virtual_desktop_infrastructure_wp.pdf>>, accessed on Feb. 20, 2013, 5 pages.

Unknown, "Understanding Full Virtualization, Paravirtualization, and Hardware Assist", <<http://www.vmware.com/files/pdf/VMware_paravirtualization.pdf>>, 2007, 17 pages.

Unknown, "VMware vSphere", <<http://www.wikipedia.org/wiki/VMware_vSphere>>, accessed on Feb. 20, 2013, 2 pages.

Diao et al., "Using MIMO Feedback Control to Enforce Policies for Interrelated Metrics With Application to the Apache Web Server", Proceedings of the Network Operations and Management Symposium, 2002, 16 pages.

Diao et al., "Using MIMO Linear Control for Load Balancing in Computing Systems", Proceeding of the 2004 American Control Conference, 2004, 6 pages.

Karlsson et al., "Triage: Performance Differentiation for Storage Systems Using Adaptive Control", ACM Transactions on Storage, vol. 1, No. 4, 2005, 24 pages.

Lee et al., "Regulating I/O Performance of Shared Storage with a Control Theoretical Approach", NASA/IEEE Conference on Mass Storage Systems and Technologies, 2004, 13 pages.

Leonard et al., "The Design and Implementation of Elastic Quotas: A System for Flexible File System Management", Columbia University Technical Report CUCS-014-02, 2012, 14 pages.

Lim et al., "Automated Control for Elastic Storage", Abstract, Proceedings of the 7th International Conference on Autonomic Computing, 2010, 2 pages.

Lu et al., "Differentiated Caching Services: A Control-Theoretical Approach", 21st International Conference on Distributed Computing Systems, 2001, 26 pages.

Unknown, "Moving Average", <<http://www.wikipedia.org/wiki/Moving_average>>, accessed on Feb. 20, 2013, 5 pages.

Padala et al., "Adaptive Control of Virtualized Resources in Utility Computing Environments", ACM EuroSys, Portugal, 2007, 14 pages.

Wang et al., "MIMO Power Control for High-Density Servers in an Enclosure", Abstract, IEEE Transactions on Parallel and Distributed Systems, vol. 21, Issue 10, 2010, 2 pages.

Wang et al., "Coordinating Power Control and Performance Management for Virtualizd Server Clusters", Abstract, IEEE Transactions on Parallel and Distributed Systems, vol. 22, Issue 2, 2011, 2 pages.

Wang et al., "Power-Efficient Response Time Guarantees for Virtualized Enterprise Servers", Proceedings of the 2008 Real-time Systems Symposium, 2008, 14 pages.

\* cited by examiner

TOKEN-BASED ADAPTIVE TASK MANAGEMENT FOR VIRTUAL MACHINES

BACKGROUND

Virtualization provides datacenters with highly efficient and available resource, networking, and storage management to reduce infrastructure costs such as capital, power, space, cooling, labor, and the like. As workloads continue to move to virtualized environments, some existing platforms fail to scale to handle the additional workloads. The existing platforms may exhibit suboptimal performance when user-level operations are scheduled poorly. For example, naïve scheduling of the user-level operations can overload the virtual datacenter and slow down the productivity and overall performance of the platform. That is, the performance (e.g., throughput) of these platforms may degrade when the system management overhead grows to a point where the platform as a whole runs out of resources. The resources may be exhausted due to physical resource constraints (e.g. processor, memory, and communications) or logical resource constraints (e.g., locks, semaphores) in any of the components of the platform. In such scenarios, not only does throughput degrade, but also the platform becomes unpredictable and unstable because the platform is running beyond its boundaries.

The existing platforms lack a mechanism to inform clients that the platform is overloaded. As such, some of the clients may implement static throttling schemes to impose artificial task limits. However, these static throttling schemes tend to be overly conservative, thus reducing performance of the clients and keeping the platforms from operating optimally.

Further, the platforms are constantly in flux due to the wide variety of operations being executed by varying amounts of clients and users. As such, the platforms do not have a fixed configuration for optimal performance, making it difficult to operate optimally. Rather, the set point for optimal performance in these platforms varies dynamically based on the type of workload, number of users issuing tasks, and other factors.

SUMMARY

One or more embodiments described herein iteratively determine an optimal amount of work to be performed efficiently in a virtual datacenter executing a plurality of virtual machines (VMs). An exemplary method is executed by a task management device in communication with the virtual datacenter. The task management device measures a first throughput at a first token batch size and a second throughput at a second token batch size. The first token batch size and the second token batch size each represent an amount of work performed by a computing device (e.g., a client). The task management device calculates a rate of change between the measured first throughput at the first token batch size and the measured second throughput at the second token batch size. An output batch size is identified based on the calculated rate of change. If the calculated rate of change is negative, the output batch size is identified based on the first token batch size, the second token batch size, or a combination thereof. For example, the mean of the first and second token batch sizes is identified as the output batch size. Otherwise, a third token batch size is selected and the operations of measuring, calculating, and identifying are repeated using the second token batch size as the first token batch size and using the third token batch size as the second token batch size. In some embodiments, the third token batch size is calculated as the moving average of a plurality of historical token batch sizes.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
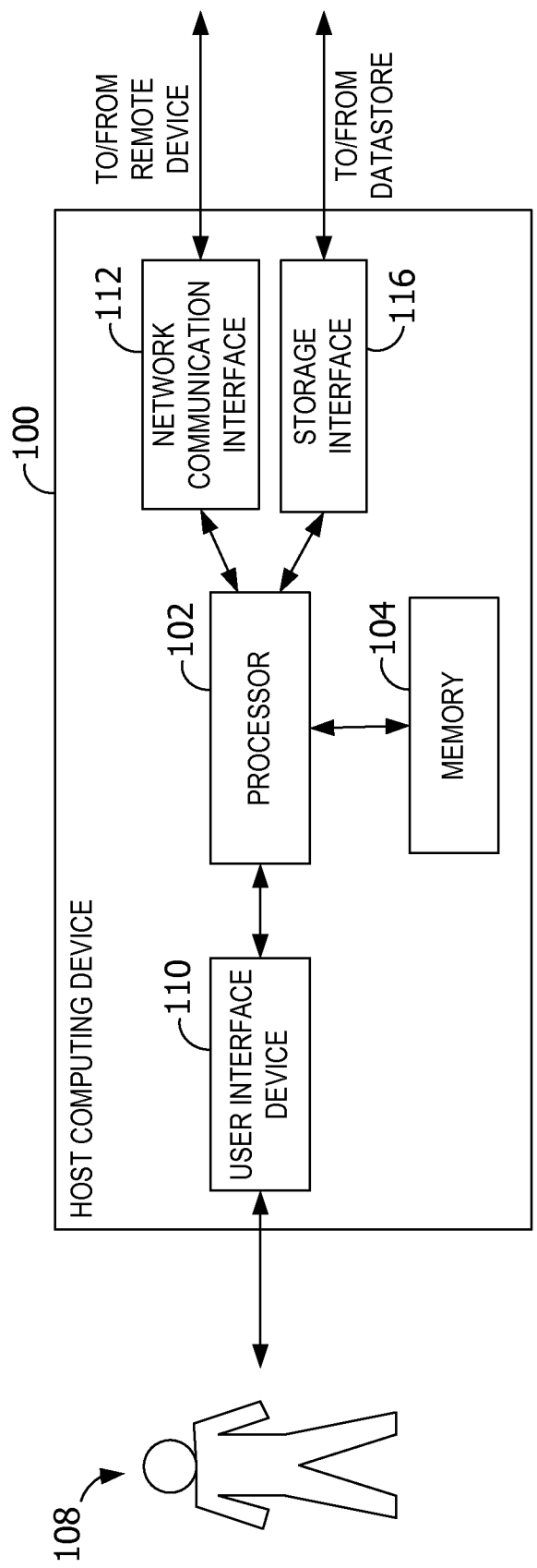
FIG. 1 is a block diagram of an exemplary host computing device.

Embodiments described herein gradually improve the performance of a virtual datacenter 318 executing a plurality of virtual machines (VMs) to eventually achieve and maintain an ideal throughput upon reaching system capacity of virtual datacenter 318. In some embodiments, the optimal number of concurrent tasks performed by virtual datacenter 318 to achieve maximal throughput is determined using a gradient-based hill-climbing approach. Dynamically controlling the number of tasks issued to virtual datacenter 318, as described herein, allows a throughput maxima to be obtained while adapting to changes in the environment of virtual datacenter 318.

For example, throughput is measured at different task concurrency levels and the quantity of tasks accepted by virtual datacenter 318 is changed (e.g., gradually increased or decreased). If the throughput improves from the change, the task concurrency is further increased. If the throughput worsens, the number of tasks entering the system is throttled by either rejecting or queuing one or more outstanding tasks 312. The increase and decrease of the task concurrency level depends, in some embodiments, on the gradient derived from the change in throughput resulting from the change in task concurrency.

Determining the optimal quantity of concurrent tasks to perform may be done adaptively, iteratively, continually, continuously, repeatedly, intermittently, or otherwise on an ongoing basis to accommodate changes in the resources available to virtual datacenter 318. As a result, aspects of the disclosure output the maximum number of tasks and/or users virtual datacenter 318 can efficiently handle, as well as how many operations should be throttled to achieve the best operational performance. In some embodiments, the throttling mechanism becomes more accurate as more task history is accumulated.

To accommodate a mix of tasks, each having different resource overheads, some embodiments normalize the tasks by assigning tokens or other weights to each of the tasks based on the historic latency and resource utilization of the task, as further described below.

Accordingly, aspects of the disclosure scale well to reduce end-to-end latency in numerous environments including, but not limited to, disaster recovery, boot storms, and bursty usage patterns. For example, issuing an optimal number of tasks on virtual datacenter 318 results in reduced recovery time (e.g., failover time), better end-to-end boot time, and a quicker provisioning process. As an example, combining the feedback mechanism with the adaptive hill-climbing approach achieved a performance improvement of up to 54% in terms of end-to-end latency when executing multiple tasks concurrently.

Aspects of the disclosure may be implemented in any component of virtual datacenter 318. Exemplary components from VMware, Inc. include, but are not limited to, the VSPHERE brand, the VCLOUD DIRECTOR brand, and the CLOUD INFRASTRUCTURE SUITE brand of virtualization products. However, aspects of the disclosure are also operable with virtualization products from companies other than VMware, Inc.

An example of a virtualization environment is next described.

Figure 3:
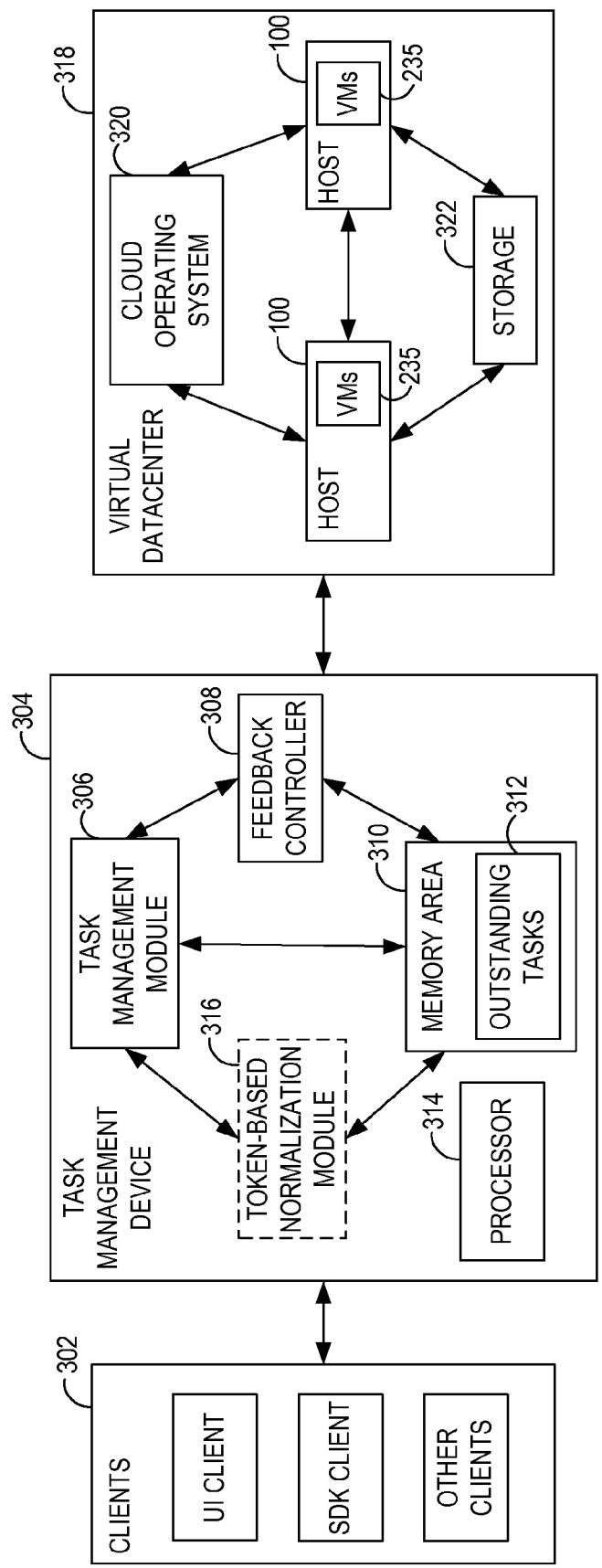
FIG. 3 is a block diagram of an adaptive task management device communicating with clients and a virtual datacenter.

FIG. 1 is a block diagram of an exemplary host computing device 100 executing in an exemplary virtual datacenter, such as virtual datacenter 318 shown in FIG. 3. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more of datastores 316, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
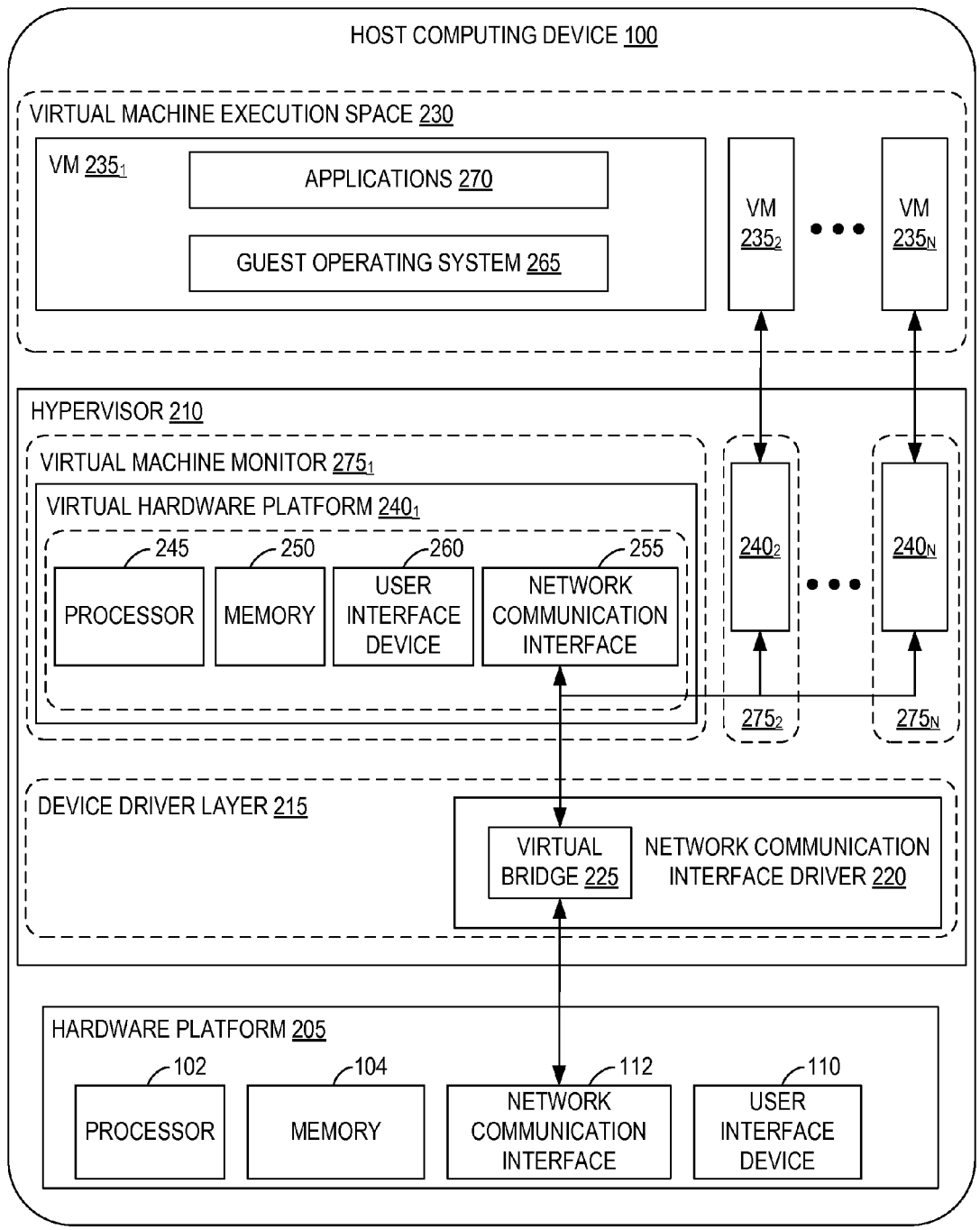
FIG. 2 is a block diagram of virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

FIG. 3 is a block diagram of an adaptive task management device 304 communicating with clients 302 and virtual datacenter 318. In the example of FIG. 3, task management device 304 is positioned or situated between clients 302 and virtual datacenter 318. In other embodiments, however, task management device 304 (or its functionality) may be included with virtual datacenter 318, included with one or more of clients 302, or a combination of both.

Exemplary clients 302 include a user interface (UI) client and a software development kit (SDK) client, although other clients 302 are contemplated. For example, other client solutions include the VCENTER SITE RECOVERY MANAGER brand software, the VMVIEW or VIRTUAL DESKTOP INFRASTRUCTURE brand software, and the VCLOUD DIRECTOR brand software, all from VMware, Inc.

Task management device 304 represents any computing device or devices executing instructions (e.g., as application programs, operating system functionality, or both) to implement the operations and functionality described herein. For example, task management device 304 executes instructions to implement the operations illustrated in FIG. 4 and FIG. 5. Task management device 304 may include any computing device or processing unit, or group of processing units or other computing devices, such as in a cloud computing configuration.

Tasks sent from clients 302 are intercepted or otherwise received by task management device 304. Task management device 304 includes a task management module 306, a feedback controller 308, a token-based normalization module 316, at least one processor 314, and a memory area 310. Task management module 306 is responsible for sending tasks to virtual datacenter 318 as well as collecting task information such as operation latency. Task management module 306 also determines how many tasks to launch in each round of tasks processed by virtual datacenter 318. Feedback controller 308 leverages this information in combination with feedback from virtual datacenter 318 (e.g., latency, throughput, and other quality of service metrics) to adaptively control (e.g., accept or reject), in conjunction with task management module 306, outstanding tasks 312 for input into virtual datacenter 318. For example, if feedback controller 308 informs task management module 306 that virtual datacenter 318 is overloaded, one or more of outstanding tasks 312 are buffered in an internal queue (e.g., memory area 310) until outstanding tasks 312 are able to be processed by virtual datacenter 318. If there is no overload condition, each of outstanding tasks 312 is passed to virtual datacenter 318 for processing. The overload condition may be defined based on throughput (e.g., if the throughput decreases at consecutive fixed intervals), latency (e.g., if the latency of individual tasks reaches a user-defined latency), and/or resource usage (e.g., if the resource usage by virtual datacenter 318 reaches a user-defined threshold).

Task management module 306 further tracks task information such as task type, start time, end time, target cluster, target datacenter, and the number of active tasks in virtual datacenter 318. Additional resource usage information relating to processing, network, and/or storage may also be tracked. The task information and resource usage information is stored in memory area 310.

Token-based normalization module 316 enables task management device 304 to quantify the workload on virtual datacenter 318. In general, the tokens corresponding to the tasks represent a cost, such as an amount of resources anticipated to be consumed by virtual datacenter 318 when performing the tasks. Token-based normalization module 316 normalizes the cost associated with each of the tasks to detect when virtual datacenter 318 has reached a resource limit.

In some embodiments, each task is represented in terms of tokens (e.g., the cost of task x is $t_x$) such that the amount of work collectively induced by each of the tasks in virtual datacenter 318 is the sum of the tokens (e.g., $t_x + t_y + \ldots$). Further, the maximum throughput capacity of virtual datacenter 318 may be represented by $t_p$, or that virtual datacenter 318 has capacity to process $t_p$ tokens. In operation, with each arriving task x, $t_x$ tokens are allocated. When task x completes, $t_x$ tokens are returned. When no tokens are available, virtual datacenter 318 is considered to have reached maximum throughput ($thpt_p$). The throughput is measured, in some embodiments, as the quantity of tokens returned per time interval.

The different costs of the tasks may be defined based on factors such as processing burden, race competitiveness, resource usage, latency, or any combination thereof. Further, in some embodiments, the costs may be defined by applying more weight to recent history to emphasize temporal changes in virtual datacenter 318.

Processor 314 includes any quantity of processing units, and is programmed to execute computer-executable instructions for implementing aspects of the disclosure. The instructions may be performed by processor 314 or by multiple processors executing within task management device 304, or performed by a processor external to task management device 304. In some embodiments, processor 314 is programmed to execute instructions such as those illustrated in the figures to achieve the maximal throughput in virtual datacenter 318 having dynamically changing resources.

Memory area 310 includes any quantity of computer-readable media associated with or accessible by task management device 304. Memory area 310, or portions thereof, may be internal to task management device 304, external to task management device 304, or both.

In the example of FIG. 3, memory area 310 stores a quantity of outstanding tasks 312 received from one or more of clients 302. The tasks represent operations or other work to be performed by, for example, a plurality of VMs 235 in virtual datacenter 318. Each task has an associated cost attribution in terms of resource usage and/or operation latency. Exemplary tasks include power-on operations, clone operations, adding a host computing device 100, removing a host computing device 100, and the like.

In some embodiments, each of the tasks is assigned to, or otherwise associated with, a task type. Each task type is associated with an amount of resources expected to be consumed during performance of tasks associated with the task type. For example, the amount and type of resources may be determined from historical data collected during performance of tasks of the given task type. Memory area 310 stores identifiers corresponding to the task types and values representing the amount and type of resources associated therewith. Memory area 310 may further store values representing the amount and type of resources associated with each of the particular outstanding tasks 312 also stored in memory area 310. The historical data may be stored in memory area 310, or other memory areas such as a removable disk.

Memory area 310 further stores data (e.g., values) describing the type and quantity of resources available within virtual datacenter 318. In some embodiments, task management device 304 updates this data as resources are added and/or removed from virtual datacenter 318. In such embodiments, task management device 304 regularly, periodically, or otherwise intermittently checks for the addition, removal, or other modification of resources available to virtual datacenter 318.

In embodiments in which the tasks are normalized with tokens, memory area 310 further stores the quantity of tokens assigned to each of outstanding tasks 312.

Virtual datacenter 318 represents any cloud-based datacenter executing VMs 235. In the example of FIG. 3, virtual datacenter 318 includes a cloud operating system 320, a plurality of hosts (e.g., host computing devices 100), and storage 322. Each of host computing devices 100 executes a plurality of VMs 235.

Figure 4:
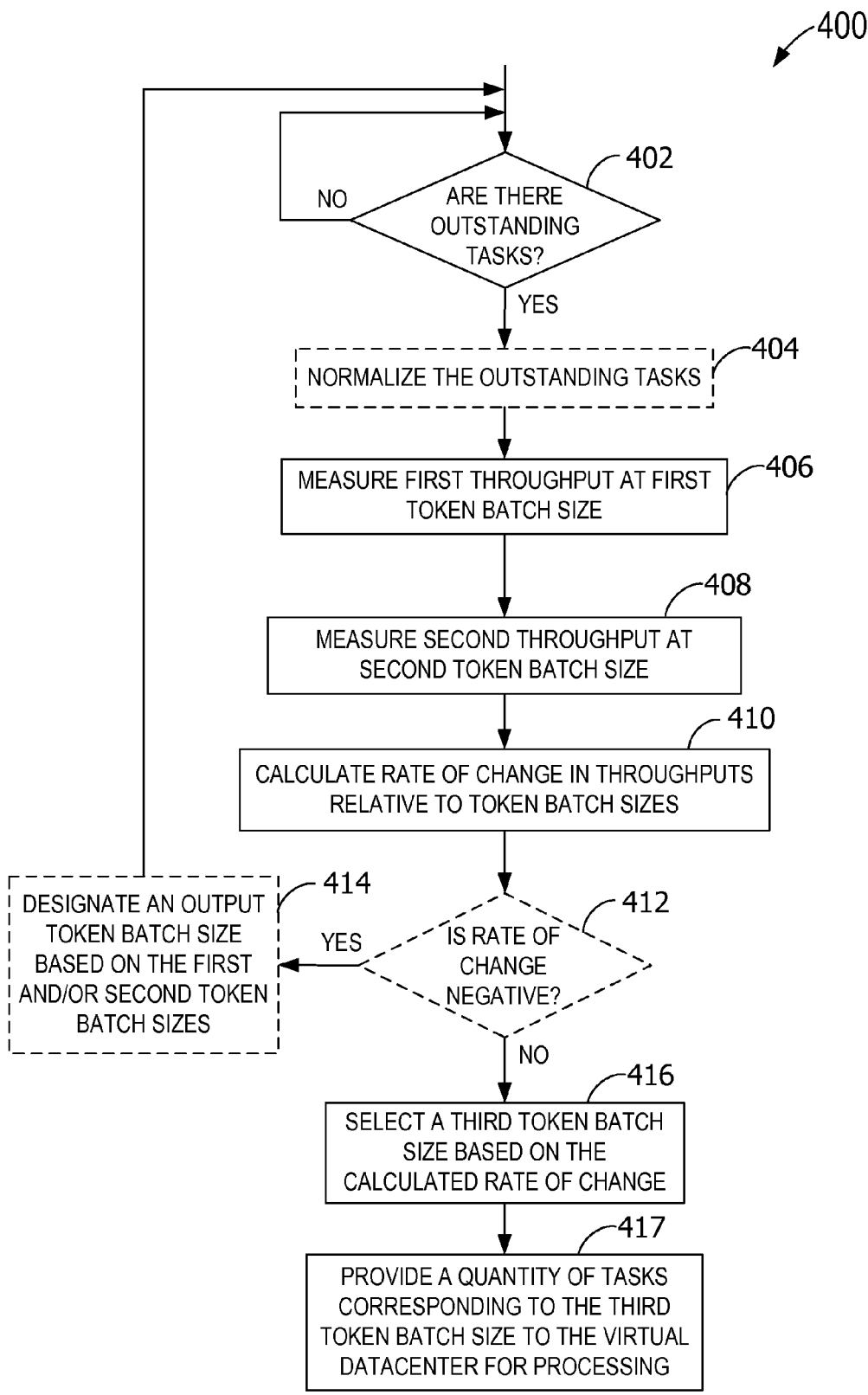
FIG. 4 is a flow chart of an exemplary method performed by the adaptive task management device for computing an optimal workload to be handled by the virtual datacenter.

FIG. 4 is a flow chart of an exemplary method 400 performed by the adaptive task management device 304 for computing an optimal workload to be handled by virtual datacenter 318. While method 400 is described with reference to execution by task management device 304 (shown in FIG. 3), it is contemplated that method 400 may be performed by any computing device interfacing with clients 302 and virtual datacenter 318. For example, task management device 304 may be part of clients 302 and/or virtual datacenter 318.

In general, method 400 is performed to iteratively determine an optimal amount of work to be performed efficiently by virtual datacenter 318, or any other computing device or group of computing devices.

At 402, task management device 304 checks for outstanding tasks 312 continually, repeatedly, continuously, periodically, intermittently, on demand, or otherwise on an on-going basis (e.g., in a separate thread from a thread handling one or more of the other operations illustrated in FIG. 4). Outstanding tasks 312 are received from one or more client devices such as clients 302. Upon receipt of outstanding tasks 312 to be performed, task management device 304 optionally normalizes each of outstanding tasks 312 at 404 to weight each of outstanding tasks 312 based on anticipated resource usage during performance of that outstanding task.

In some embodiments, normalization includes assigning a quantity of tokens to each of outstanding tasks 312, where each token represents a unit of work and/or operation cost, and each token consumes the same amount of resources when performed (e.g., has the same operation cost). In some embodiments, the quantity of tokens is assigned based on the amount of resources to be consumed during performance of each of outstanding tasks 312. As such, at least because different tasks may consume different quantities of resources, the tokens are assigned or allocated proportional to each of outstanding tasks 312 based on expected consumption of resources by outstanding task.

In some embodiments, outstanding tasks 312 are categorized or otherwise grouped into categories based on the type or quantity of operations involved in each of outstanding tasks 312. Task management device 304 then dynamically weights each of the categories based on anticipated resource consumption of a typical task in that category. Each of outstanding tasks 312 in the same category thus receives the same quantity of assigned tokens.

If virtual datacenter 318 is not overloaded, task management device 304 passes outstanding tasks 312 to virtual datacenter 318 for processing. Otherwise, task management device 304 performs operations 406 et seq.

At 406, task management device 304 measures a first throughput at a first token batch size. The first token batch size is selected from historical data (e.g., historical datapoints collected), or represents a default or initial token batch size. In some embodiments, the first token batch size represents the more recent quantity of tasks or tokens concurrently processed by virtual datacenter 318. Upon completion of outstanding tasks 312 associated with the first token batch size (e.g., one round), the first throughput is calculated by, for example, total tasks completed in this round divided by total latency (e.g., tasks per minute).

At 408, task management device 304 measures a second throughput at a second token batch size. In some embodiments, the second token batch size is selected based on a quantity of outstanding tasks 312 (e.g., normalized with tokens) received from clients 302 to be performed by virtual datacenter 318. Upon completion of outstanding tasks 312 associated with the second token batch size, the second throughput is calculated by, for example, total tasks completed in this round divided by total latency (e.g., tasks per minute). The first token batch size and the second token batch size each represent an amount of work to be performed by, for example, virtual datacenter 318.

At 410, task management device 304 calculates a rate of change in the first throughput at the first token batch size relative to the second throughput at the second token batch size. In some embodiments, calculating the rate of change comprises calculating a gradient.

In some embodiments, if the calculated rate of change is negative at 412, the first token batch size, the second token batch size, or a derivative or combination thereof, is designated as the output token batch size at 414. For example, the mean of the first and second token batch sizes is designated as the output token batch size. The output token batch size is then used to determine how many of outstanding tasks 312 should be processed concurrently by virtual datacenter 318 in the next round of processing. A quantity of the normalized outstanding tasks 312 corresponding to the identified output token batch size is selected. For example, a quantity of tokens corresponding to the output token batch size is allocated or distributed among outstanding tasks 312 thus selecting a set of outstanding tasks 312. Task management device 304 then identifies the selected outstanding tasks 312 to the datacenter for performance by the plurality of VMs 235 in virtual datacenter 318.

As a result, task management device 304 throttles outstanding tasks 312 to reduce or limit the amount of outstanding tasks 312 to be processed by virtual datacenter 318. In some embodiments, task management device 304 rejects or queues one or more of outstanding tasks 312 for future processing (e.g., in another round).

In other embodiments (e.g., such as shown in FIG. 4), task management device 304 selects a third token batch size at 416. In some embodiments, the third token batch size is selected based on the calculated rate of change (e.g., the gradient). For example, the calculated rate of change is used to weight the second token batch size to produce the third token batch size.

Alternatively or in addition, the third token batch size is calculated as the moving average of a plurality of historical token batch sizes. For example, a moving average filter is applied to a plurality of the historical token batch sizes. In some embodiments, the second token batch size throughput represents an average of a quantity of historical datapoints collected before the second token batch size throughput is measured. The third token batch size throughput represents an average of a quantity of historical datapoints collected before the third token batch size throughput is measured. Some embodiments apply higher weights to more recent historical datapoints to ensure that the throughput is based more on recent datapoints collected and less on older datapoints collected. This ensures a more recent representation of the state of virtual datacenter 318 and smoothens any noise in throughput reported by virtual datacenter 318.

At 417, task management device 304 provides a quantity of tasks corresponding to the selected third token batch size to virtual datacenter 318 for processing. The second token batch size is copied to be the first token batch size, and the third token batch size is copied to be the second token batch size. Then, the throughput resulting from performance of tasks using the newly-defined second token batch size (e.g., the third token batch size) is measured. The rate of change in throughputs relative to the first token batch size and the second token batch size is re-calculated, and another third token batch size is selected. These operations are thus iteratively repeated to identify the optimal output token batch size for any given condition of virtual datacenter 318 (e.g., resources, latency, processing load, etc.).

In some embodiments, one or more computer-readable storage media store computer-executable instructions that, when executed, cause processor 314 to intermittently identify maximal throughput in virtual datacenter 318 having dynamically changing resources by performing the operations illustrated in FIG. 4.

Figure 5:
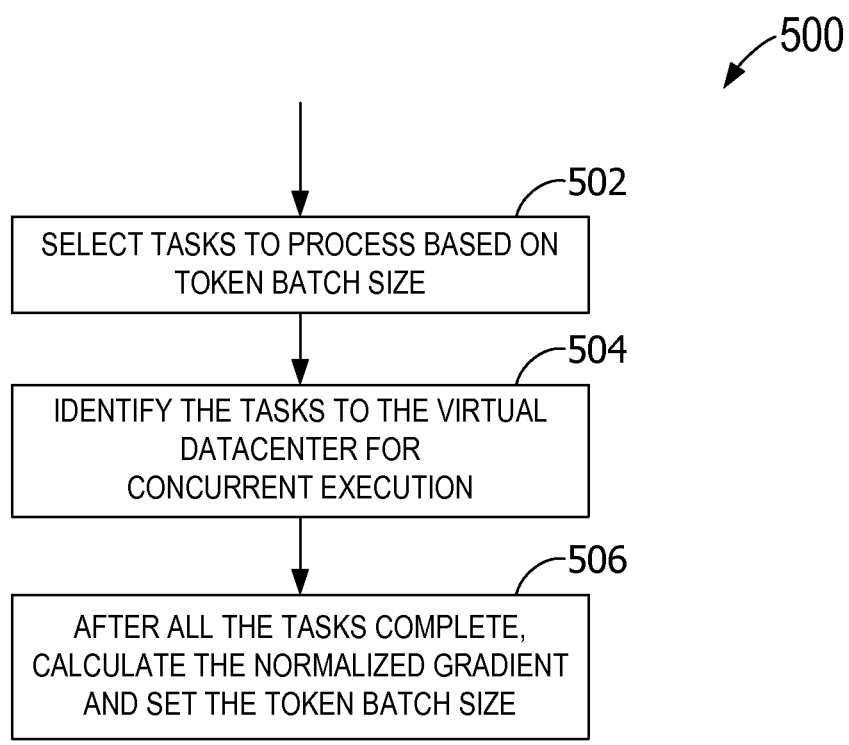
FIG. 5 is a flow chart of an exemplary method performed by the adaptive task management device for throttling tasks input to the virtual datacenter.

FIG. 5 is a flow chart of an exemplary method 500 performed by the adaptive task management device 304 for throttling tasks input to virtual datacenter 318. While method 500 is described with reference to execution by task management device 304 (shown in FIG. 3), it is contemplated that method 500 may be performed by any computing device interfacing with clients 302 and virtual datacenter 318. For example, task management device 304 may be part of clients 302 and/or virtual datacenter 318.

At 502, task management device 304 selects outstanding tasks 312 to batch process based on the output token batch size resulting from performance of the operations illustrated in FIG. 4. At 504, task management device 304 identifies the selected outstanding tasks 312 to virtual datacenter 318. Virtual datacenter 318 then concurrently processes the batch of selected outstanding tasks 312 at 506.

If there are additional outstanding tasks 312 to process (e.g., some outstanding tasks 312 have been rejected or queued), task management device 304 repeats operations 502 et seq. to process these additional outstanding tasks 312. Otherwise, the task management device checks for additional outstanding tasks from clients 302, such as shown at 402 in FIG. 4.

As an example, outstanding tasks 312 may include a batch of VM "power-on" requests, such as in a boot storm. Concurrent execution of these tasks produces a larger load on the resources of virtual datacenter 318 (processing, network, storage, etc.). Boot storms may occur, for example, after power outages. The throughput of an exemplary virtual datacenter 318 varies based on the batch sizes of these requests, as shown in FIG. 6.

Figure 6:
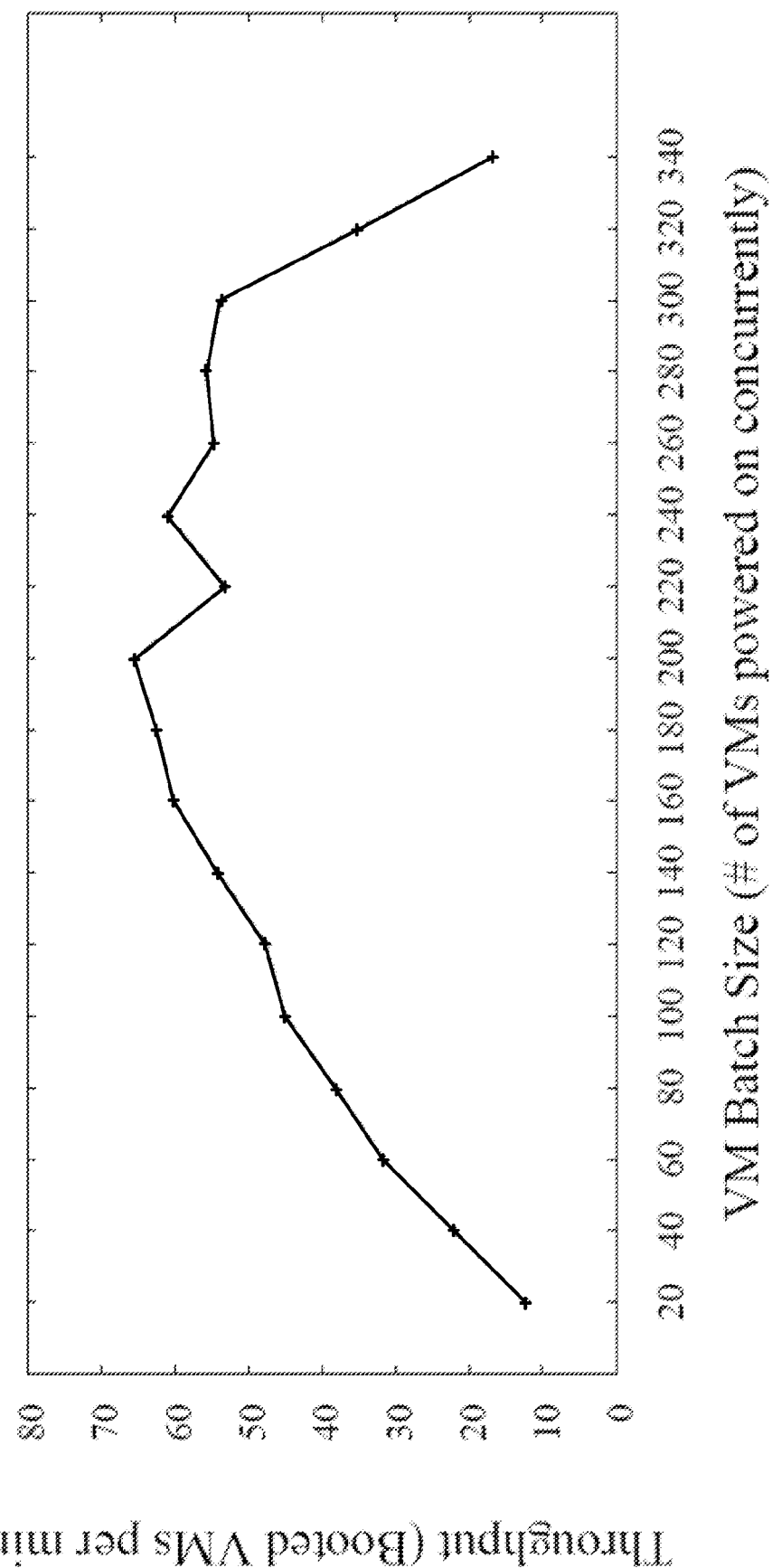
FIG. 6 is a line graph of exemplary throughput relative to an input batch size.

FIG. 6 is a line graph of exemplary throughput relative to input batch sizes without performance of the optimizing operations illustrated in FIG. 4 and FIG. 5. The line graph illustrates the impact of highly concurrent workloads on performance of virtual datacenter 318. As shown in FIG. 6, the throughput hits a maxima after a certain batch size. As the batch size is increased past this point, the throughput begins to drop significantly. In the example of FIG. 6, the optimum or ideal batch size is powering on approximately 200 VMs concurrently.

Figure 7:
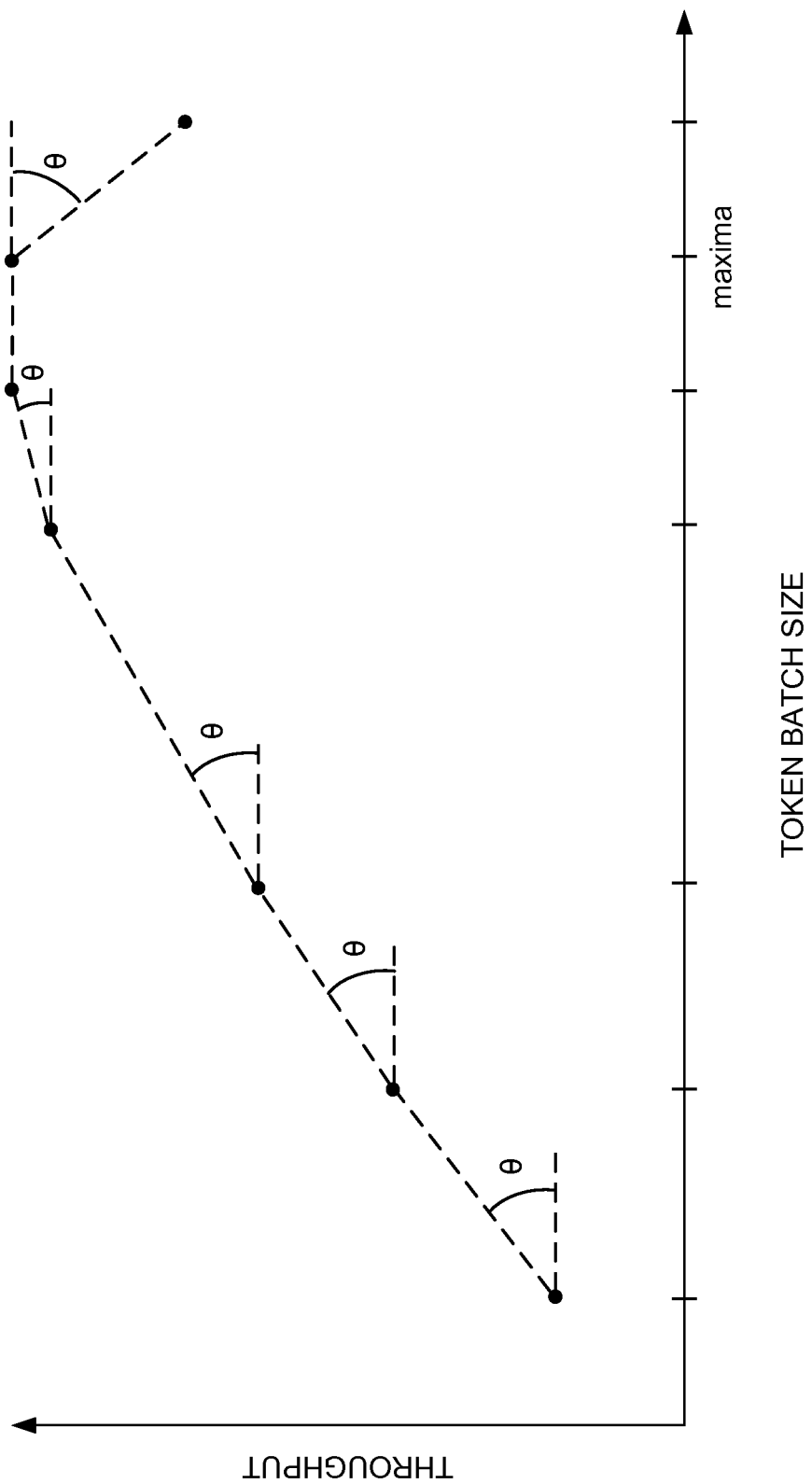
FIG. 7 is a line graph of exemplary throughput at token batch sizes selected based on a rate of change of the throughput.

In contrast, FIG. 7 illustrates a line graph of an exemplary pattern of throughput from token batch sizes selected in accordance with performance of the operations illustrated in FIG. 4 and FIG. 5. In the example of FIG. 7, once the maxima is reached at a particular batch size (e.g., a decrease in throughput is measured when increasing the token batch size), task management device 304 prevents the token batch size from increasing further to prevent a decrease in throughput.

The token batch sizes are selected based on a rate of change of the throughput, as described in greater detail with reference to FIG. 8 and FIG. 9 below. In general, the angle θ represents the rate of change (e.g., gradient) from one token batch size to the next token batch size. The value of θ is used to calculate the next token batch size to input into virtual datacenter 318. Once θ turns negative, task management system concludes that the maximum throughput has been achieved given the current resources available in virtual datacenter 318. As the resources are changed (e.g., added, removed, or modified), the iterations through the token batch sizes illustrated in FIG. 7 are repeated until another maxima has been identified, which may be different from a previous maxima. For example, if virtual datacenter 318 has resources added, the maxima is likely to be greater than a previous maxima.

As such, aspects of the disclosure adaptively identify the boundaries imposed by the resources available in virtual datacenter 318. The boundaries vary with time because the resources vary with time. For example, the resources are shared across multiple clients 302 and the characteristics of the resources change with background activity such as hardware/software failures, backups, and the like. Identifying the boundaries enables aspects of the disclosure to determine the quantity of tasks to perform concurrently to achieve optimal throughput.

Figure 8:
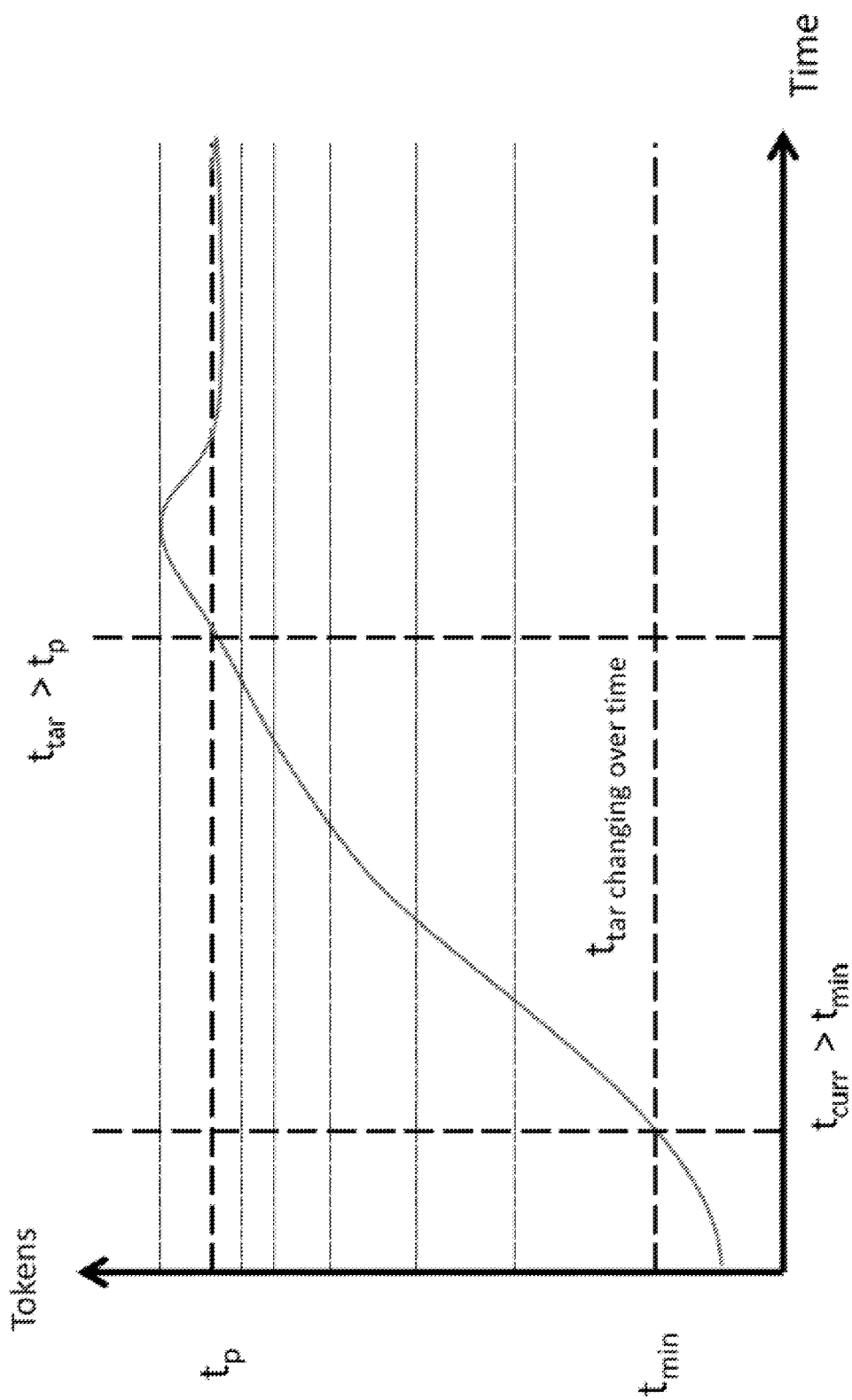
FIG. 8 is a line graph illustrating an exemplary evolution over time of a quantity of tokens as the exemplary methods of FIG. 4 and FIG. 5 are performed.
Figure 9:
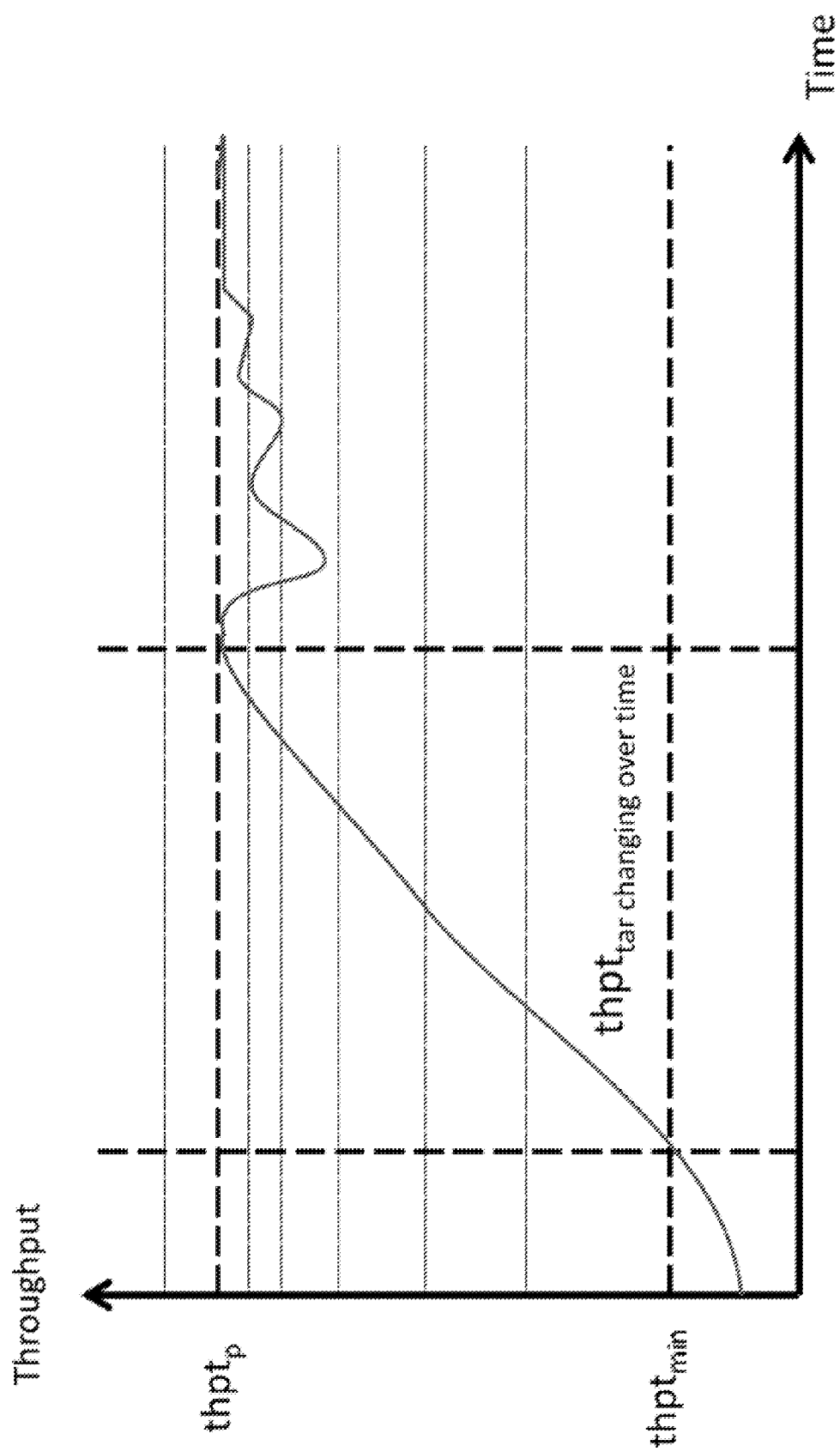
FIG. 9 is a line graph illustrating an exemplary evolution over time of throughput as the exemplary methods of FIG. 4 and FIG. 5 are performed.

FIG. 8 is a line graph illustrating an exemplary evolution over time of a quantity of tokens as the exemplary methods of FIG. 4 and FIG. 5 are performed. FIG. 9 is a line graph illustrating an exemplary evolution over time of throughput as the exemplary methods of FIG. 4 and FIG. 5 are performed. In particular, if a current quantity of outstanding tasks 312 $t_{curr}$ is less than a concurrency target number $t_{tar}$, then task management device 304 passes outstanding tasks 312 to virtual datacenter 318. However, if $t_{curr}$ is greater than $t_{tar}$, task management device 304 performs the operations illustrated in FIG. 4 and FIG. 5 to throttle outstanding tasks 312.

Initially, $t_{tar}$ is set to $t_{min}$, the initial number of concurrent tasks that virtual datacenter 318 will handle to start processing tasks. The variable $t_{min}$ is a configurable value. If $t_{curr}$ is greater than $t_{tar}$, $t_{tar}$ is increased to be twice as much as $t_{min}$ to collect at least two data points about the task throughput to help identify the trend of the throughput. To avoid overloading virtual datacenter 318, $t_{min}$ is kept low initially relative to the resources available to virtual datacenter 318. Further increases of $t_{tar}$ are determined by feedback controller 308 according to the hill-climbing illustrated in FIG. 7. The variable $t_{tar}$ at is gradually increased until virtual datacenter 318 achieves a maxima for throughput with capacity $t_p$.

During each round, feedback controller 308 issues $t_{tar}$ tasks concurrently and waits for each of the issued tasks to complete. As tasks are completed in each round, the throughput is measured after all the tokens in the current round were received. The gradient is calculated as shown in Equation (1) below.

$$\text{gradient} = (thpt_{tar} - thpt_{tar-1}) / (t_{tar} - t_{tar-1}) \quad (1)$$

In some embodiments, the next batch size, represented by $t_{tar+1}$, is increased or decreased based on Equation (2) and Equation (3), as shown below, where the value for the variable weight is assigned the value of gradient calculated according to Equation (1) above.

$$\text{if gradient} > 0, t_{tar+1} = t_{tar} + (t_{tar} * \text{weight}) \quad (2)$$

$$\text{if gradient} < 0, t_{tar+1} = t_{tar-1} \quad (3)$$

In other embodiments, the next batch size $t_{tar+1}$, is increased or decreased based on Equation (4) and Equation (5), as shown below.

$$\text{gradient}_{norm} = \arctan(\text{gradient}) / 90 \quad (4)$$

$$t_{tar+1} = t_{tar} * (1 + \text{gradient}_{norm}) \quad (5)$$

In Equation (1) above, $thpt_{tar}$ is the overall throughput as of the current round, $thpt_{tar-1}$ is the overall throughput as of the previous round, $t_{tar}$ is the number of concurrent tokens issued in the current round, and $t_{tar-1}$ is the concurrent tokens issued for the previous round. In Equation (4) above, the arc tangent is divided by 90 in the formula to ensure the normalized gradient $\text{gradient}_{norm}$ is between (−1) (e.g., inclusive) and (1) (e.g., exclusive).

If the gradient calculated across $t_{tar}$ and $t_{tar-1}$ is positive, it suggests that there is additional headroom within virtual datacenter 318 and $t_{tar+1}$ is increased in accordance. The larger the value of gradient, the larger the batch size will be for the next round and the quicker the local maxima for throughput will be found. In contrast, a negative value of gradient means that the throughput has dropped. When the value of gradient is negative, task management device 304 reverts back to the last known token batch size $t_{tar-1}$ that had better throughput, as shown in Equation (3) above. The rationale is that $t_{tar-1}$ is the closest token batch size to $t_p$. In other embodiments, however, rather than reverting to $t_{tar-1}$, task management device 304 decreases the tokens based on the value of gradient to obtain a high overall throughput across rounds, as shown in Equation (5) above.

In this manner, the increase in batch size is reflective of the throughput trend of virtual datacenter 318 (e.g., the batch size is increased more aggressively if virtual datacenter 318 detects a steep rise in throughput). Once the throughput curve starts to flatten, the batch size is increased more conservatively by task management device 304. At any given instant, task management device 304 maintains a constant inflow of $t_{tar}$ tokens on the system until feedback controller 308 updates $t_{tar}$. Some aspects of the disclosure further set a floor value for available tokens to enable task management device 304 to launch at least one operation.

Those skilled in the art would recognize that Equations (1), (2), (3), (4), and (5) above are intended to be exemplary only, and one of skill in the art would recognize alternatives all of which are intended to be within the scope of this disclosure.

Figure 10:
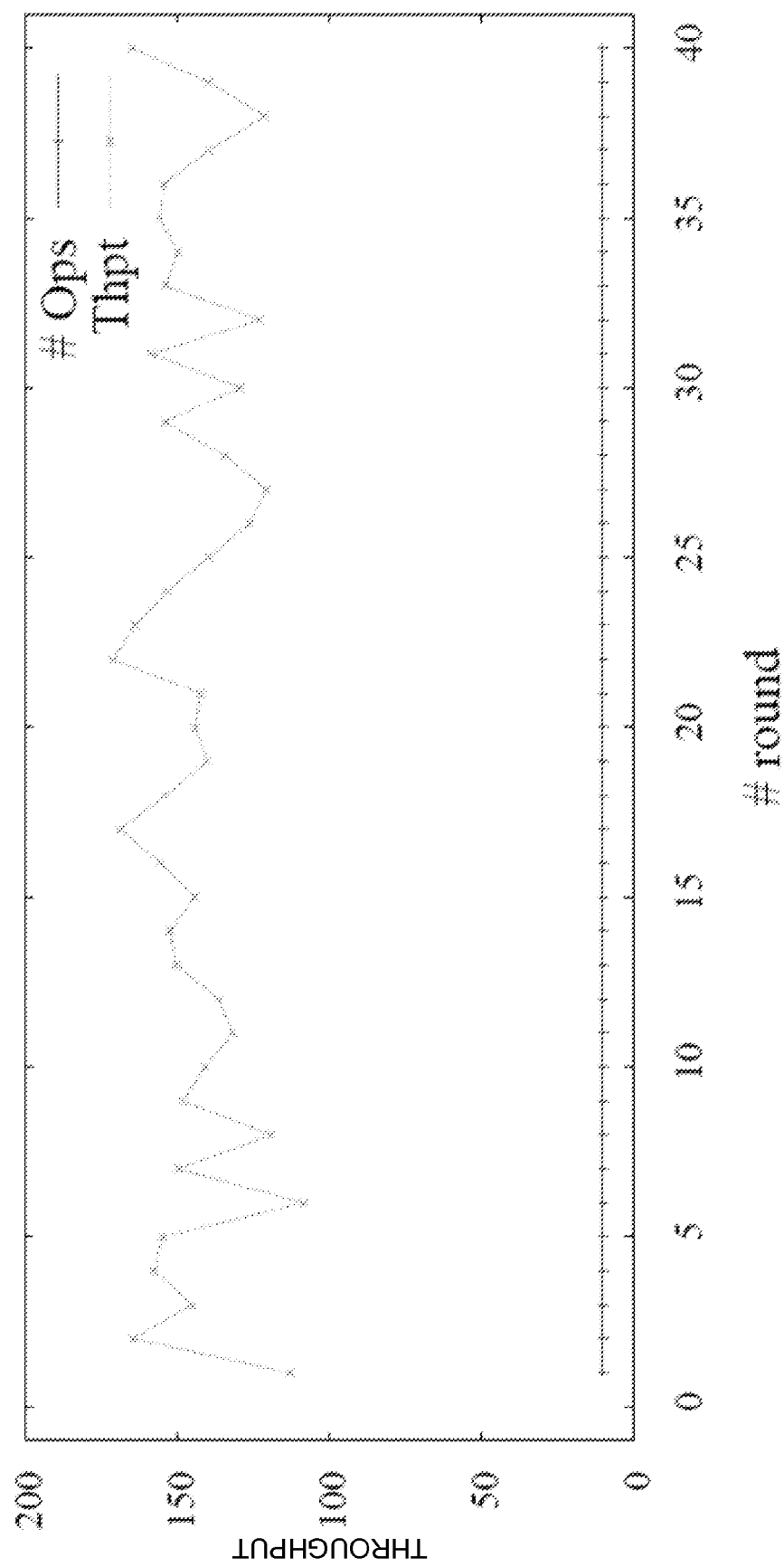
FIG. 10 is a line graph illustrating variations in throughput due to background activities.

FIG. 10 is a line graph illustrating variations in throughput due to background activities using static throttling, as opposed to the adaptive throttling described herein. To obtain the experimental data shown in FIG. 10, four hundred VM memory reconfiguration operations were performed by a cluster of three hosts (e.g., host computing device 100) each having hundreds of VMs installed thereon. Ten tasks per round were statically launched, and the throughput of each round was observed. As shown in FIG. 10, even when the quantity of operations is fixed, the throughput of each round fluctuates.

Figure 11:
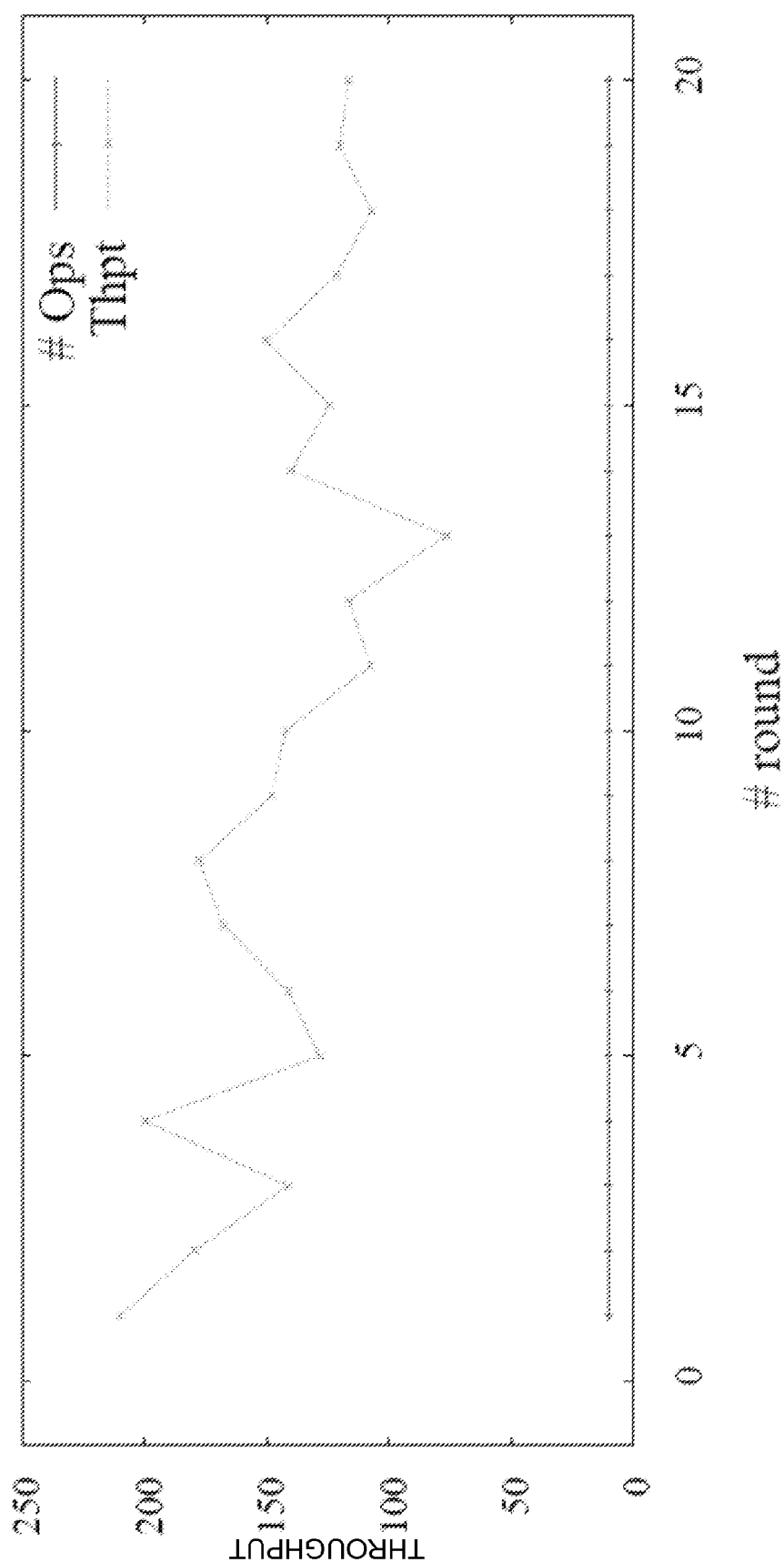
FIG. 11 is a line graph illustrating variations in throughput due to loading on the virtual datacenter.

FIG. 11 is a line graph illustrating variations in throughput due to loading on virtual datacenter 318 using static throttling, as opposed to the adaptive throttling described herein. To obtain the experimental data shown in FIG. 11, two hundred VM power-on operations were performed by a cluster of three hosts (e.g., host computing device 100) each having hundreds of VMs installed thereon. Ten tasks per round were statically launched, and the throughput of each round was observed. As shown in FIG. 11, even when the quantity of operations is fixed, the throughput of each round decreases as additional VMs are powered on (e.g., increasing the background load).

Figure 12:
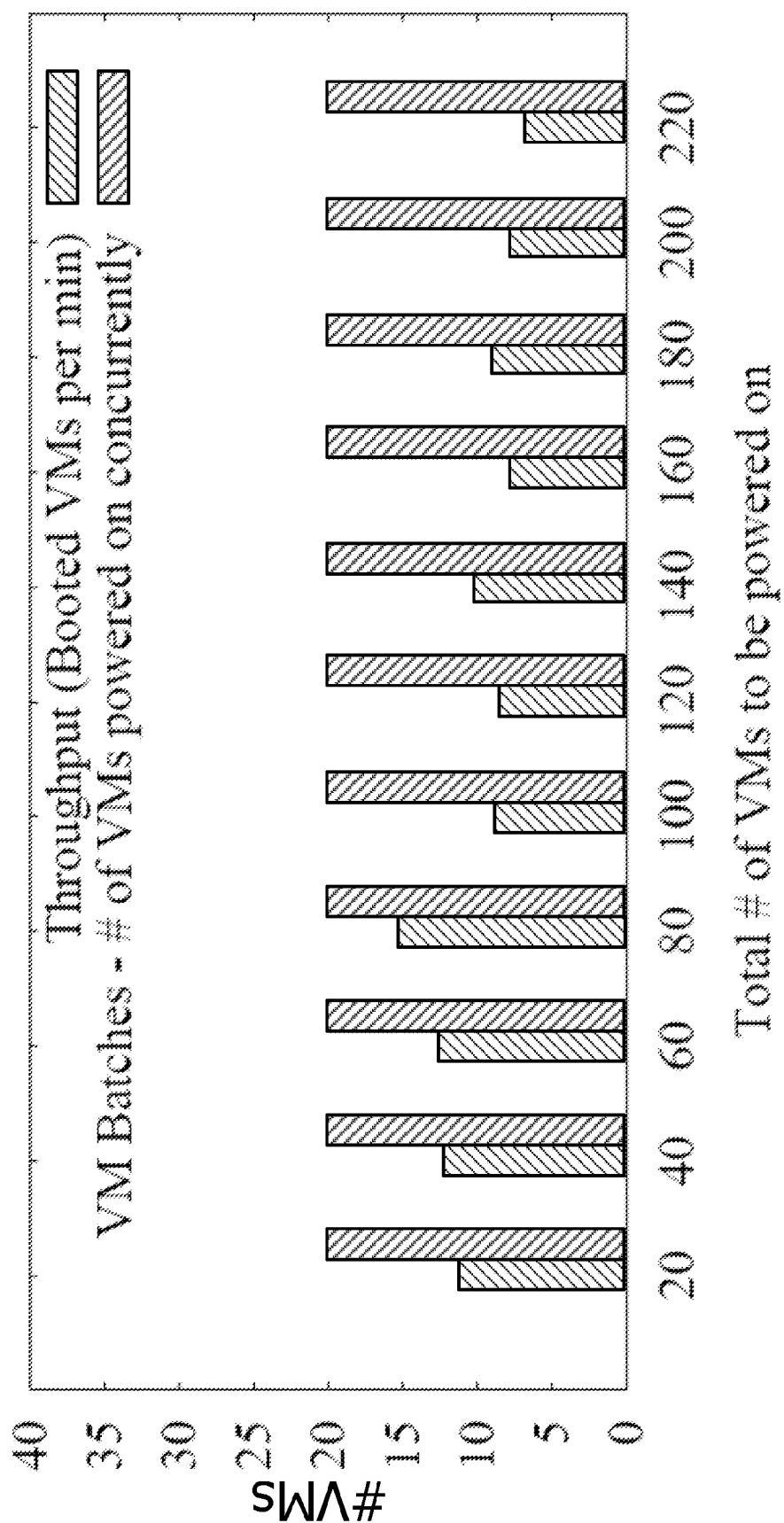
FIG. 12 is a bar chart illustrating variations in throughput as the quantity of virtual machines powered on concurrently remains static.

FIG. 12 is a bar chart illustrating variations in throughput as the quantity of virtual machines powered on concurrently remains static, as opposed to the adaptive throttling described herein. As shown in FIG. 12, the throughput remains approximately constant, which suggests that virtual datacenter 318 is lowly utilized and that there is space for throughput improvement.

Figure 13:
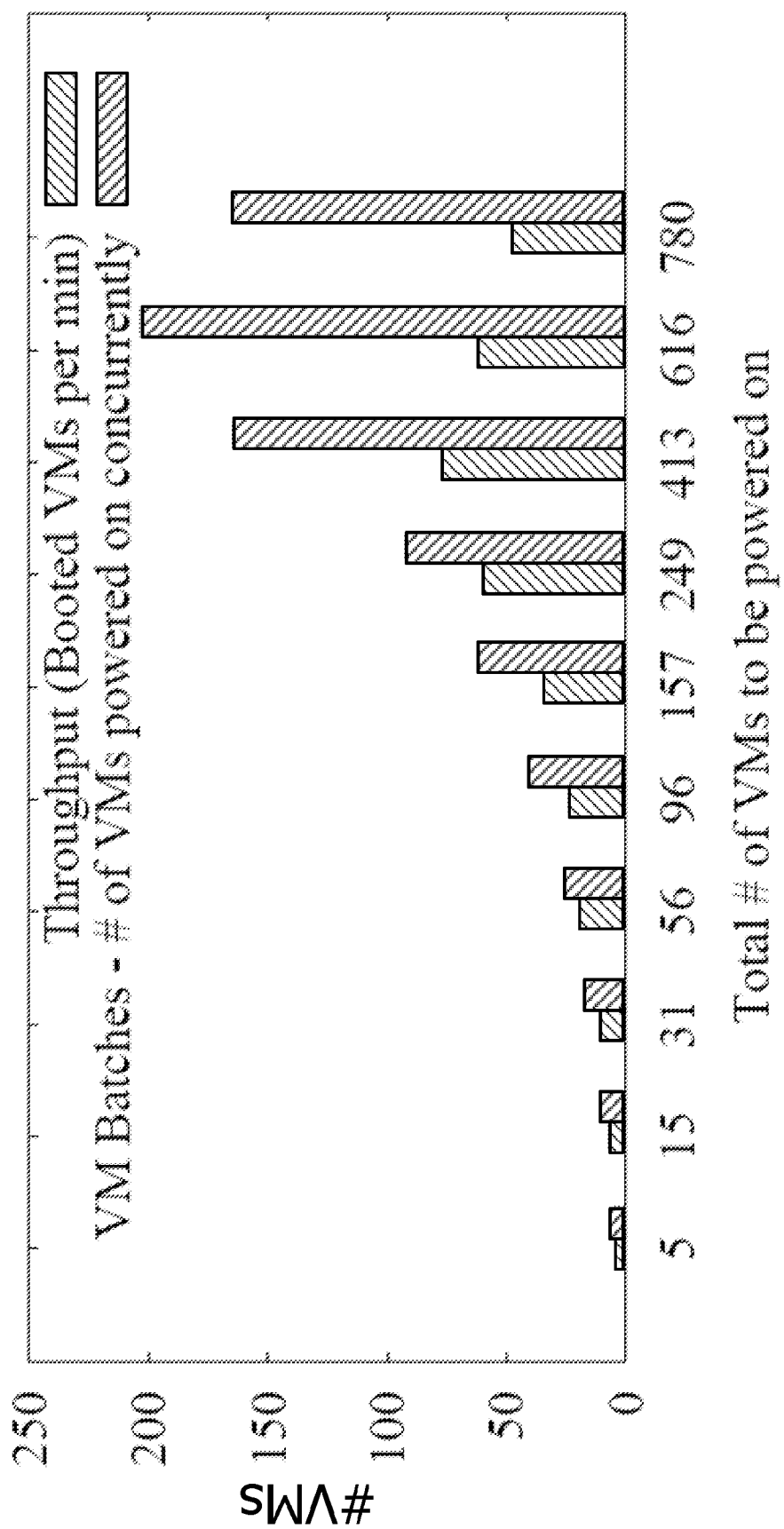
FIG. 13 is a bar chart illustrating variations in throughput as the quantity of virtual machines powered on concurrently changes.

FIG. 13 is a bar chart illustrating variations in throughput as the quantity of virtual machines powered on concurrently changes per the adaptive throttling described herein. As shown in FIG. 13, the maximum throughput ($t_p$) is achieved when 413 boot up operations are performed. Once the batch size $t_{tar}$ increases beyond that, the throughput drops. In response, task management device 304 reduced the quantity of tasks to mitigate the situation. In particular, task management device 304 reverted the batch size $t_{tar}$ to the last best known batch size $t_{tar-1}$ where the highest throughput had been achieved.

From the experiment results shown in FIG. 13, the throughput drops even further as shown when 780 boot up operations are performed with a batch size of $t_{tar-1}$. In this example, the throughput decreased because the powered-on VMs were issuing numerous input/output commands thus incurring additional background load. Despite the decrease in throughput, task management system prevented further overload of virtual datacenter 318 and not a single power-on operation failed in the last three batch periods shown in FIG. 13.

Figure 14:
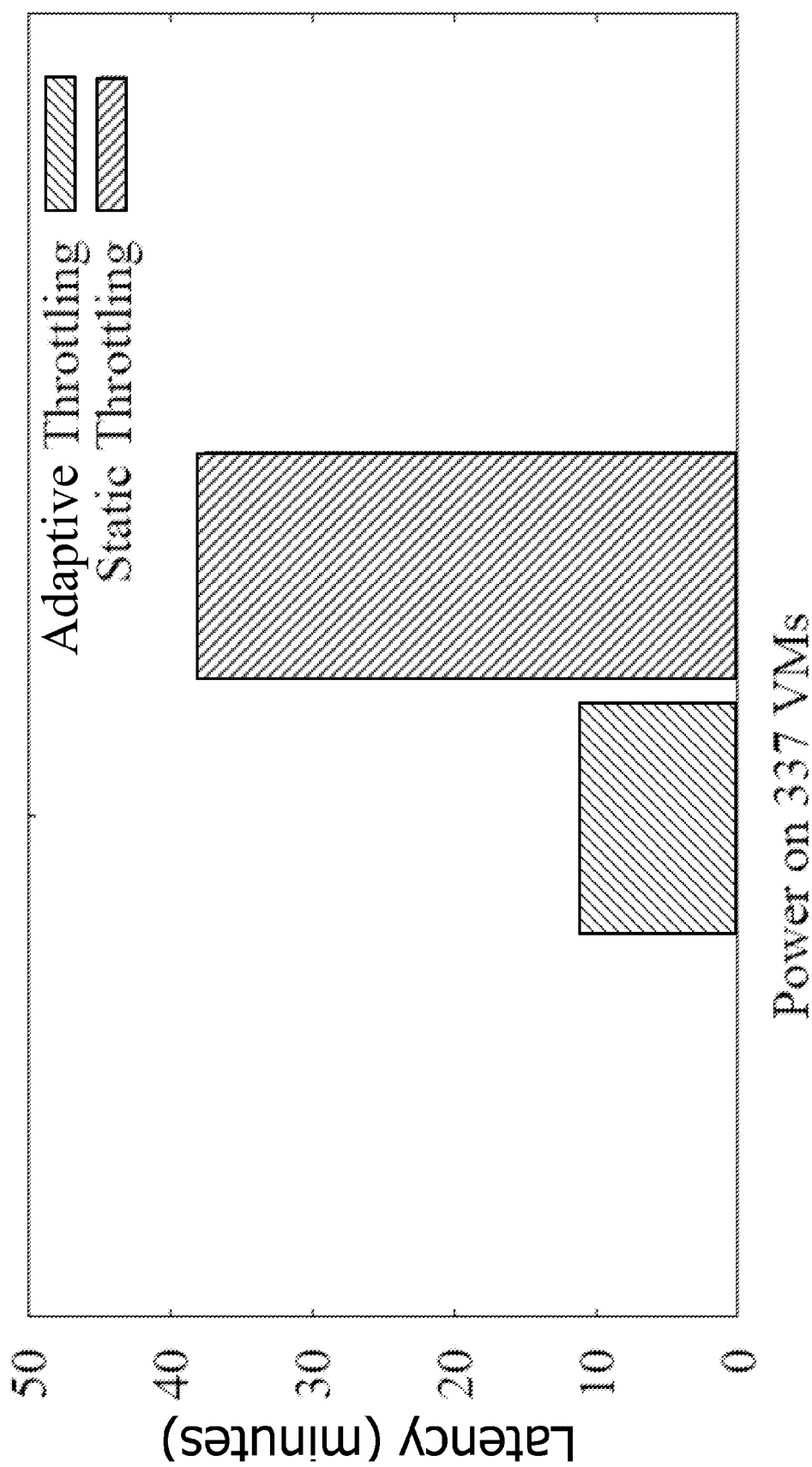
FIG. 14 is a bar chart comparing the latency from static throttling of 337 power-on tasks versus adaptive throttling of the 337 power-on tasks using the exemplary methods illustrated in FIG. 4 and FIG. 5.

FIG. 14 is a bar chart comparing the latency from static throttling of 337 power-on tasks versus the adaptive throttling of the 337 power-on tasks using the exemplary methods illustrated in FIG. 4 and FIG. 5. The latency reflects end-to-end workload latency. As shown in FIG. 14, the adaptive throttling approach performed more than three times better than the static throttling approach.

In the examples of FIGS. 15-20, the throughput is calculated as the total number of finished tasks divided by total latency (e.g., tasks per minute). Further, the tokens shown in these figures represent the available tokens within virtual datacenter 318, and one operation represents one task.

Figure 15:
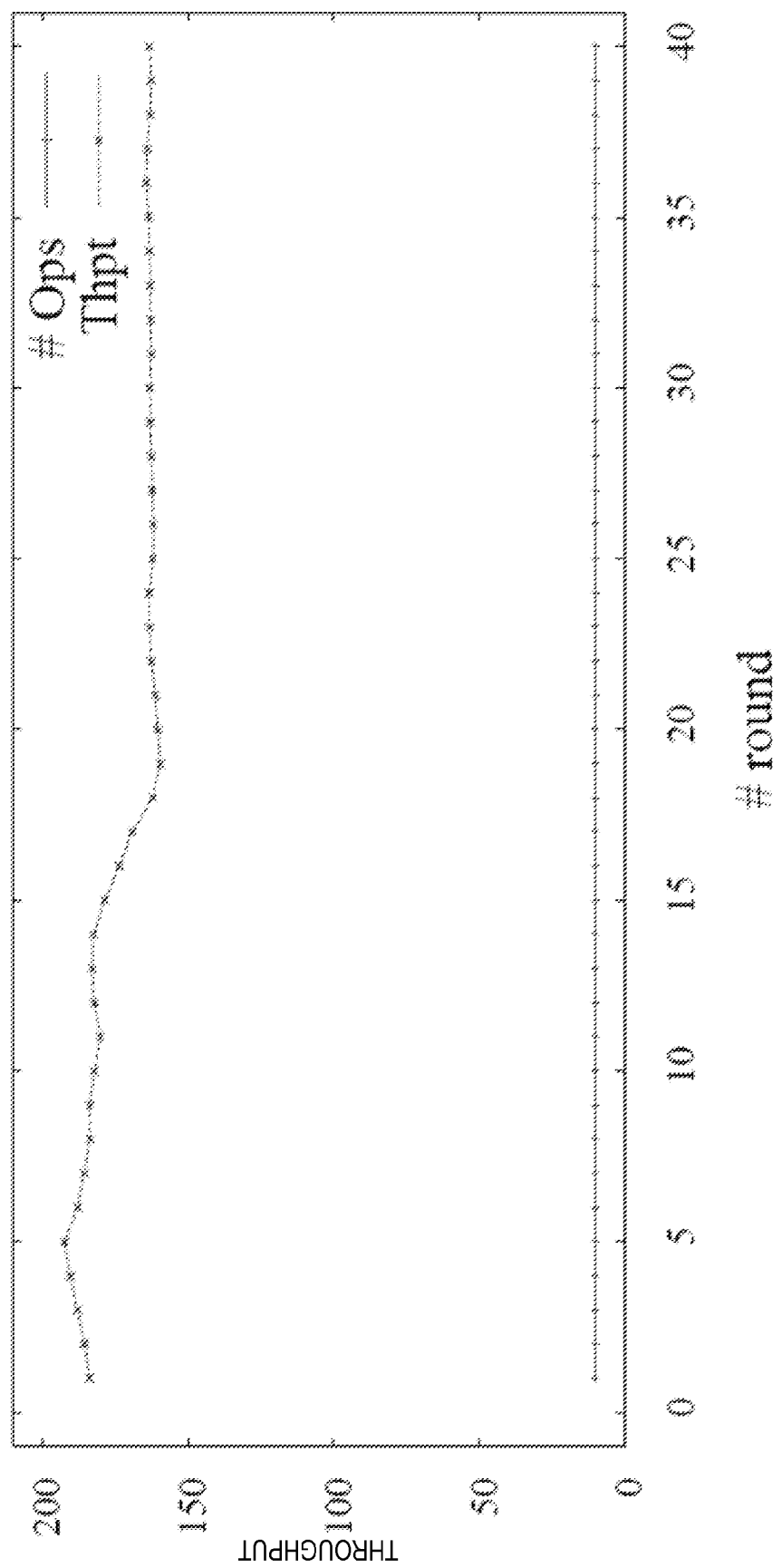
FIG. 15 is a line graph illustrating throughput with static throttling of memory reconfiguration tasks.
Figure 16:
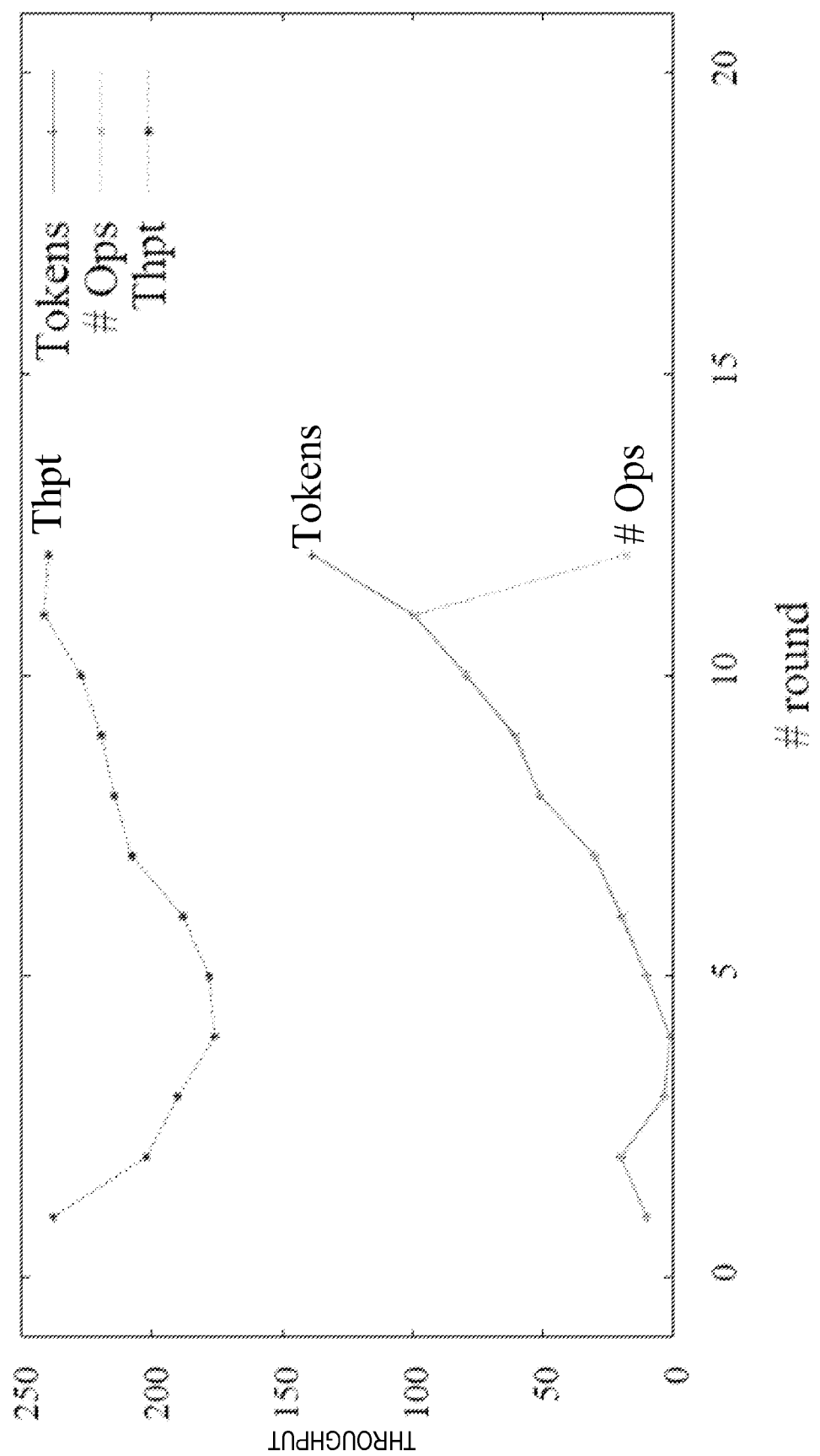
FIG. 16 is a line graph illustrating throughput with adaptive throttling of memory reconfiguration tasks using the exemplary methods illustrated in FIG. 4 and FIG. 5.

FIG. 15 is a line graph illustrating throughput with static throttling of memory reconfiguration tasks. In contrast, FIG. 16 is a line graph illustrating throughput with the adaptive throttling of memory reconfiguration tasks using the exemplary methods illustrated in FIG. 4 and FIG. 5. Four hundred concurrent tasks were performed to obtain the data shown in both of these figures.

In the static throttling approach shown in FIG. 15, ten tasks are launched in each round. In contrast, in the adaptive throttling approach shown in FIG. 16, ten tasks are launched in the first round, twenty tasks are launched in the second round (per the gradient calculation), and then the quantity of tasks adapts to the overall throughput variations as described herein.

In the static throttling approach shown in FIG. 15, the overall throughput is relatively stable but not improving further even when there are resources available to improve performance. In contrast, the adaptive throttling approach shown in FIG. 16 adapts to the overall throughput variations by (1) decreasing the batch size as overall throughput is observed to decrease in the beginning several rounds and then (2) increasing the batch size as overall throughput is observed to increase in the last several rounds. In the last round, there are not enough tasks left to process; therefore, the number of operations is not the same as the value of tokens.

Figure 17:
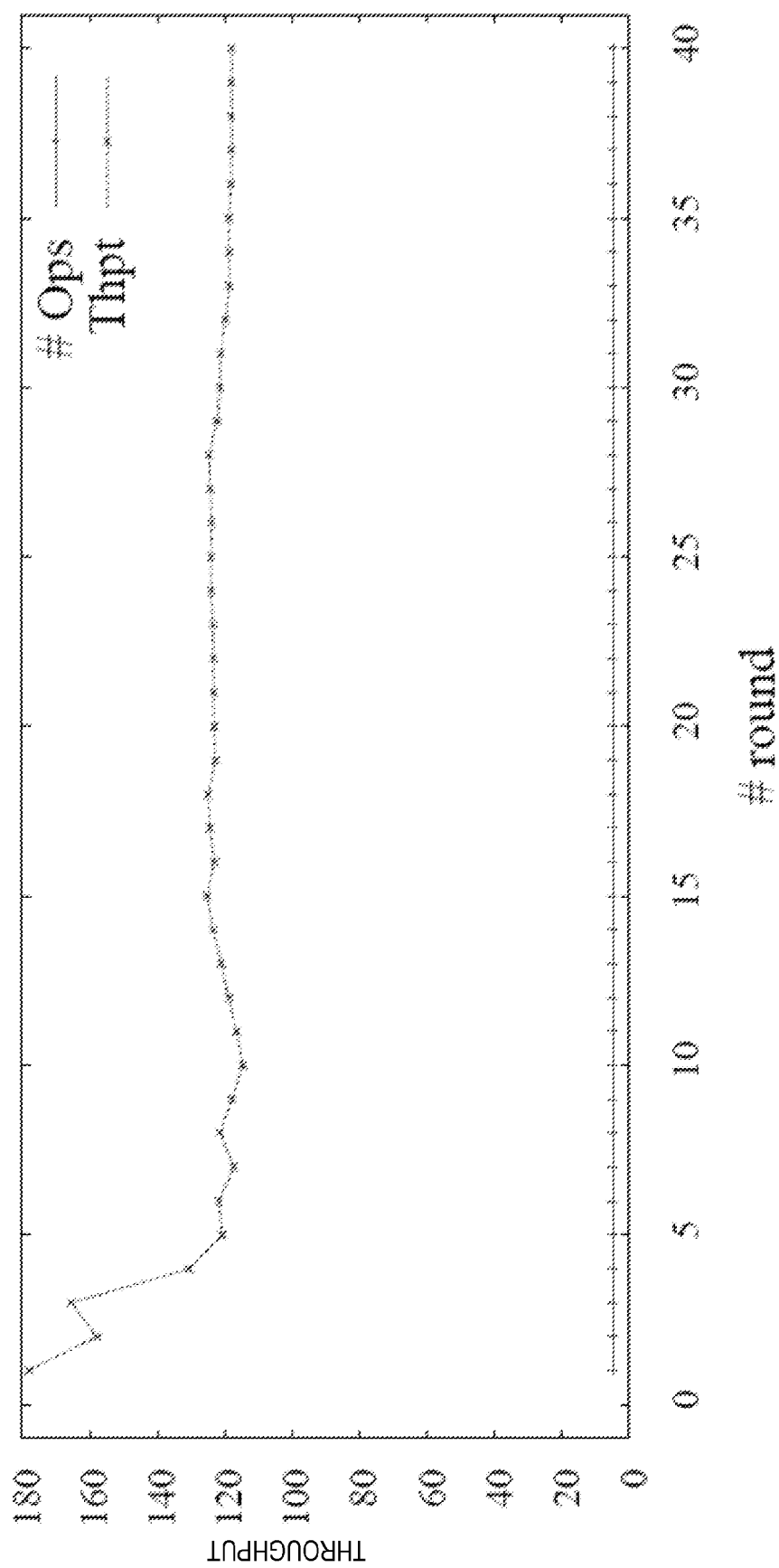
FIG. 17 is a line graph illustrating throughput with static throttling of power-on tasks.
Figure 18:
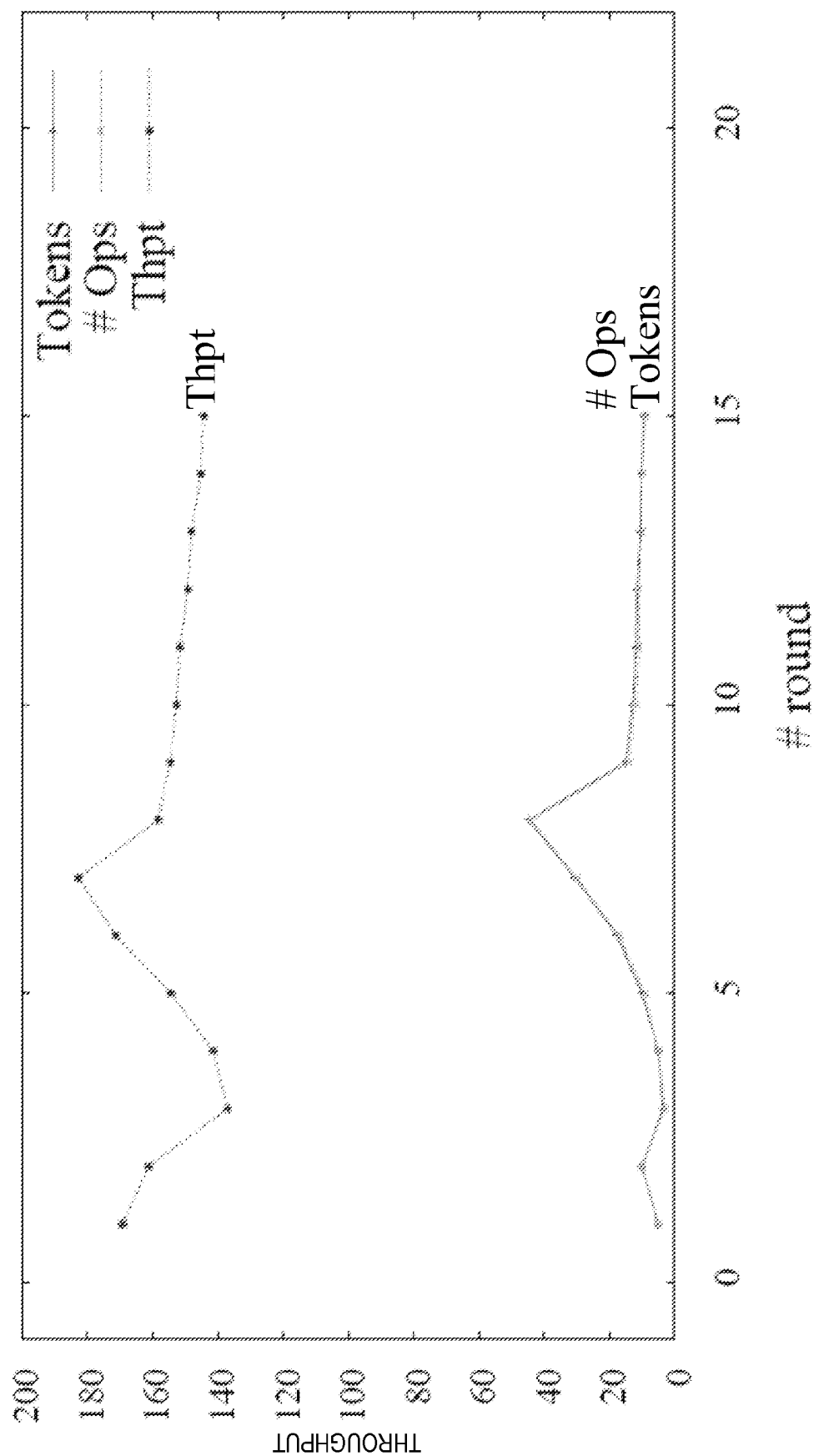
FIG. 18 is a line graph illustrating throughput with adaptive throttling of power-on tasks using the exemplary methods illustrated in FIG. 4 and FIG. 5.

FIG. 17 is a line graph illustrating throughput with static throttling of power-on tasks. In contrast, FIG. 18 is a line graph illustrating throughput with the adaptive throttling of power-on tasks using the exemplary methods illustrated in FIG. 4 and FIG. 5. Two hundred concurrent tasks were performed to obtain the data shown in both of these figures. In the static throttling approach shown in FIG. 17, five tasks are launched in each round. In contrast, in the adaptive throttling approach shown in FIG. 18, five tasks are launched in the first round, ten tasks are launched in the second round (per the gradient calculation), and then the quantity of tasks adapts to the overall throughput variations as described herein.

In the static throttling approach shown in FIG. 17, the overall throughput drops in the first several rounds because of fluctuations, and then becomes relatively stable. In contrast, the adaptive throttling approach shown in FIG. 18 decreases the batch size in the third round, and then increases the batch size in the following rounds until a local maxima is achieved. Then, virtual datacenter 318 becomes overloaded because there are now more powered-on VMs, and the overall throughput drops. At this point, the adaptive throttling approach adapts to the changing background load by dynamically dropping the token value, and therefore, maintaining an overall high throughput (e.g., higher than the throughput shown in FIG. 17).

Figure 19:
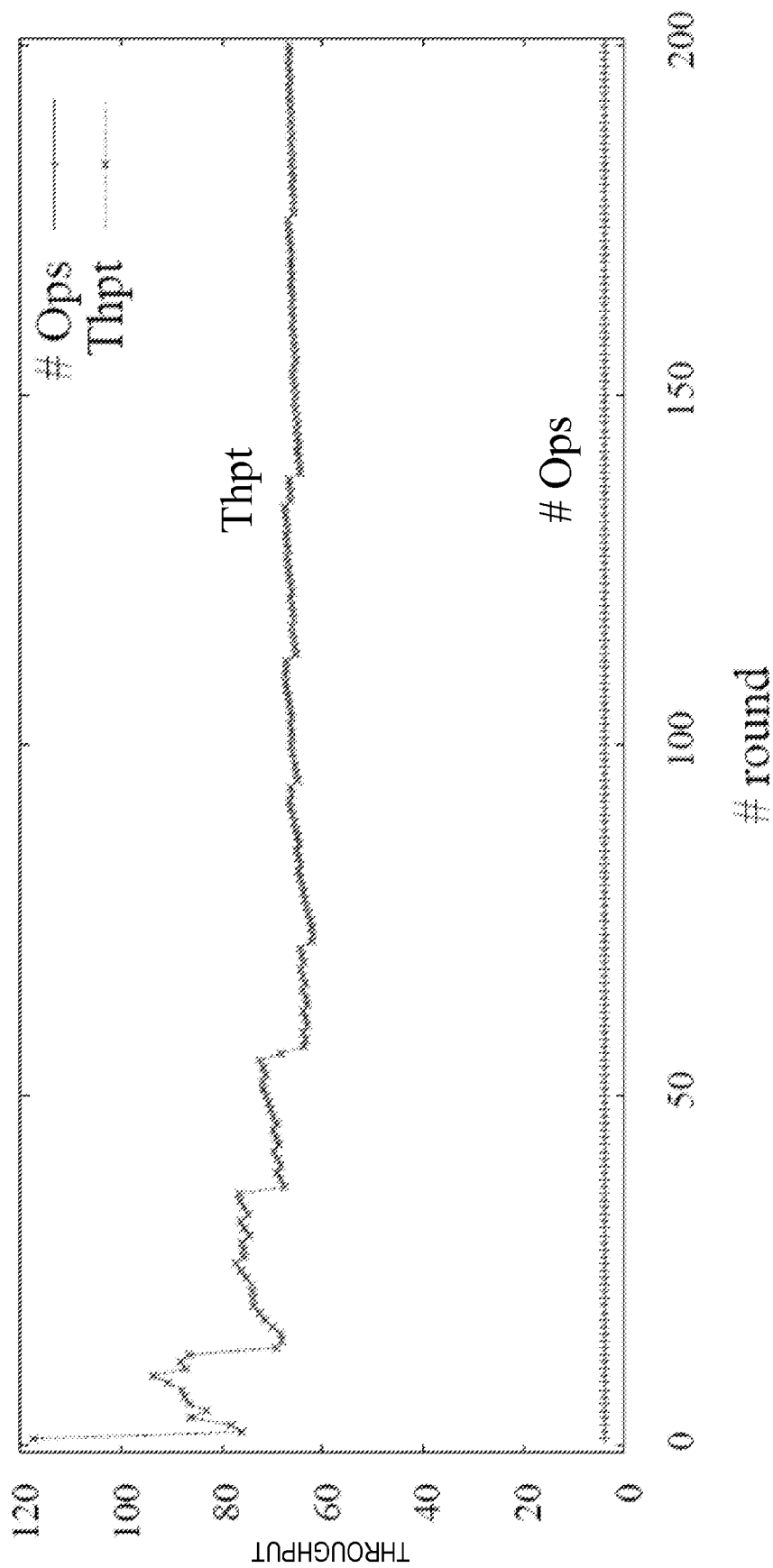
FIG. 19 is a line graph illustrating throughput with static throttling of mixed operation tasks.
Figure 20:
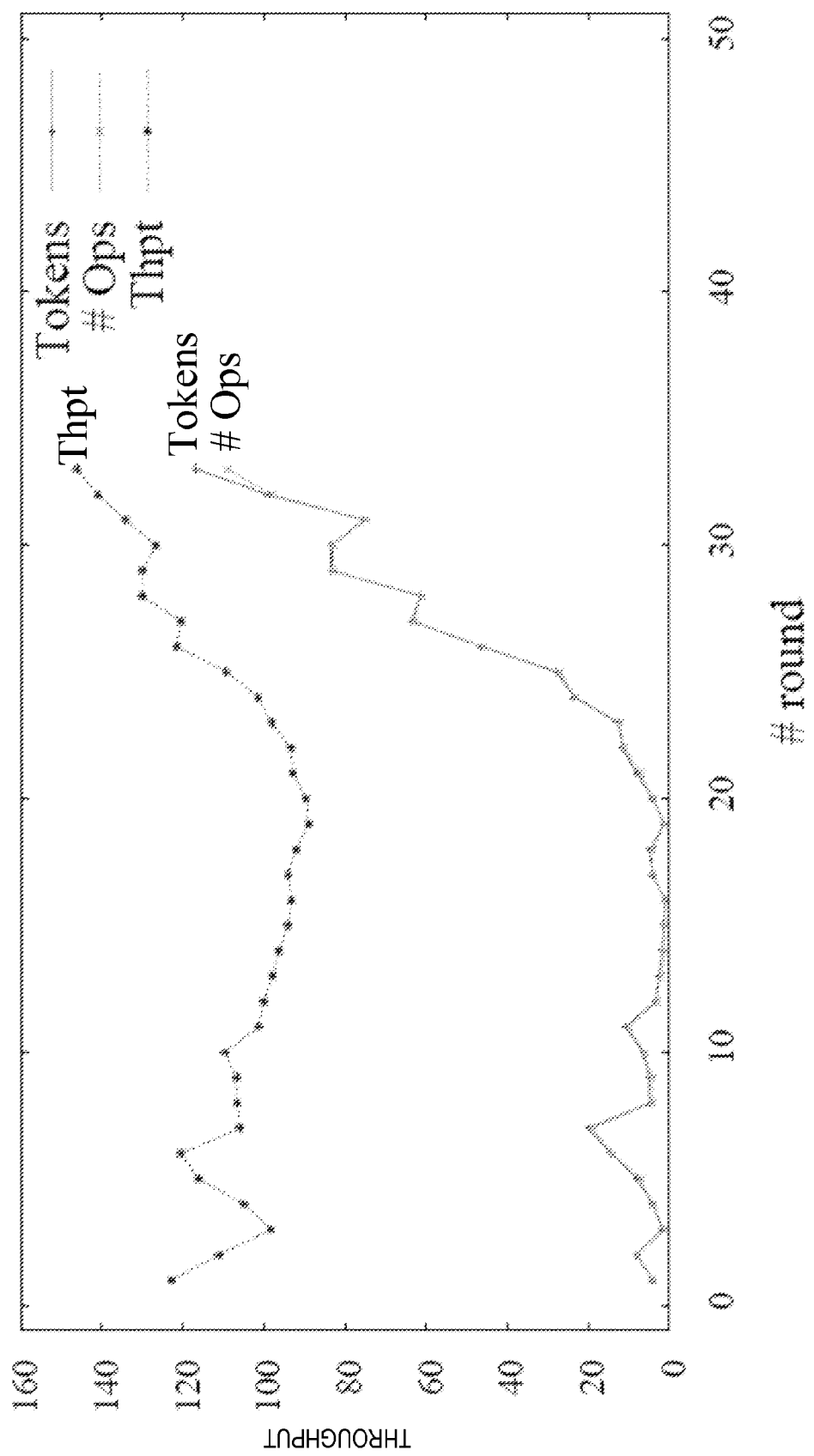
FIG. 20 is a line graph illustrating throughput with adaptive throttling of mixed operation tasks using the exemplary methods illustrated in FIG. 4 and FIG. 5.

FIG. 19 is a line graph illustrating throughput with static throttling of mixed operation tasks. In contrast, FIG. 20 is a line graph illustrating throughput with adaptive throttling of mixed operation tasks using the exemplary methods illustrated in FIG. 4 and FIG. 5. FIG. 19 and FIG. 20 represent data obtained from performance of mixed VM operations with equal distribution among four operations: VM memory reconfiguration, VM power-on, VM creation, and VM snapshot creation operations. There are in total 800 concurrent tasks.

In the static throttling approach shown in FIG. 19, four tasks are launched in each round. In contrast, in the adaptive throttling approach shown in FIG. 20, four tasks are launched in the first round, eight tasks are launched in the second round (per the gradient calculation), and then the quantity of tasks adapts to the overall throughput variations as described herein.

In the static throttling approach shown in FIG. 19, the overall throughput fluctuates and degrades in the first several rounds, and then turns relatively stable. In contrast, the adaptive throttling approach shown in FIG. 20 adapts to the changes in local overall throughput, achieves two local maxima in the beginning several rounds, and then gradually increases the batch size to further improve the performance throughput in the last several rounds. In the last round, there are not enough tasks left; therefore, the number of operations is not the same as the value of tokens.

Overall, the throughput obtained in the adaptive throttling approach is greater than the throughput obtained in the static throttling approach.

Figure 21:
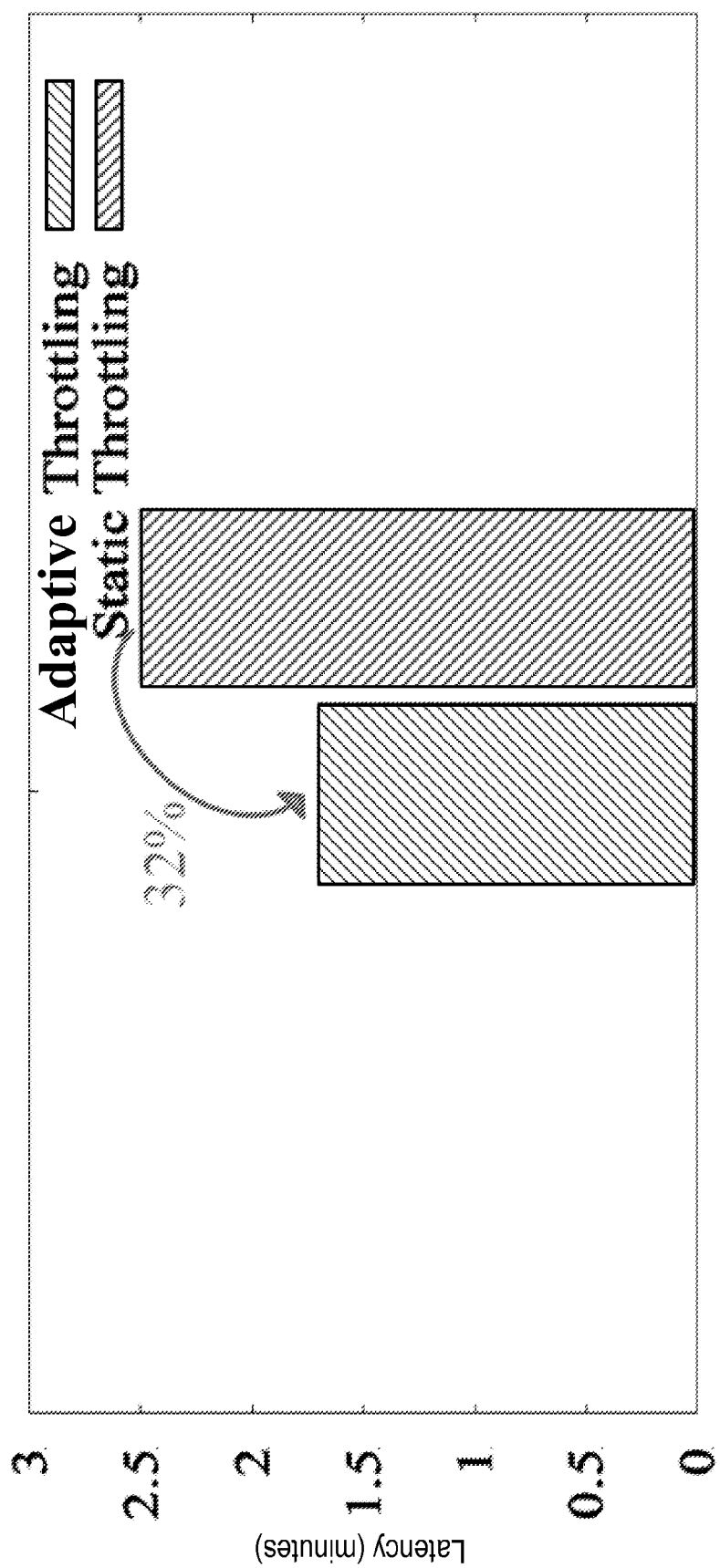
FIG. 21 is a bar chart comparing the latency from static throttling of memory reconfiguration tasks versus adaptive throttling of memory reconfiguration tasks using the exemplary methods illustrated in FIG. 4 and FIG. 5.
Figure 22:
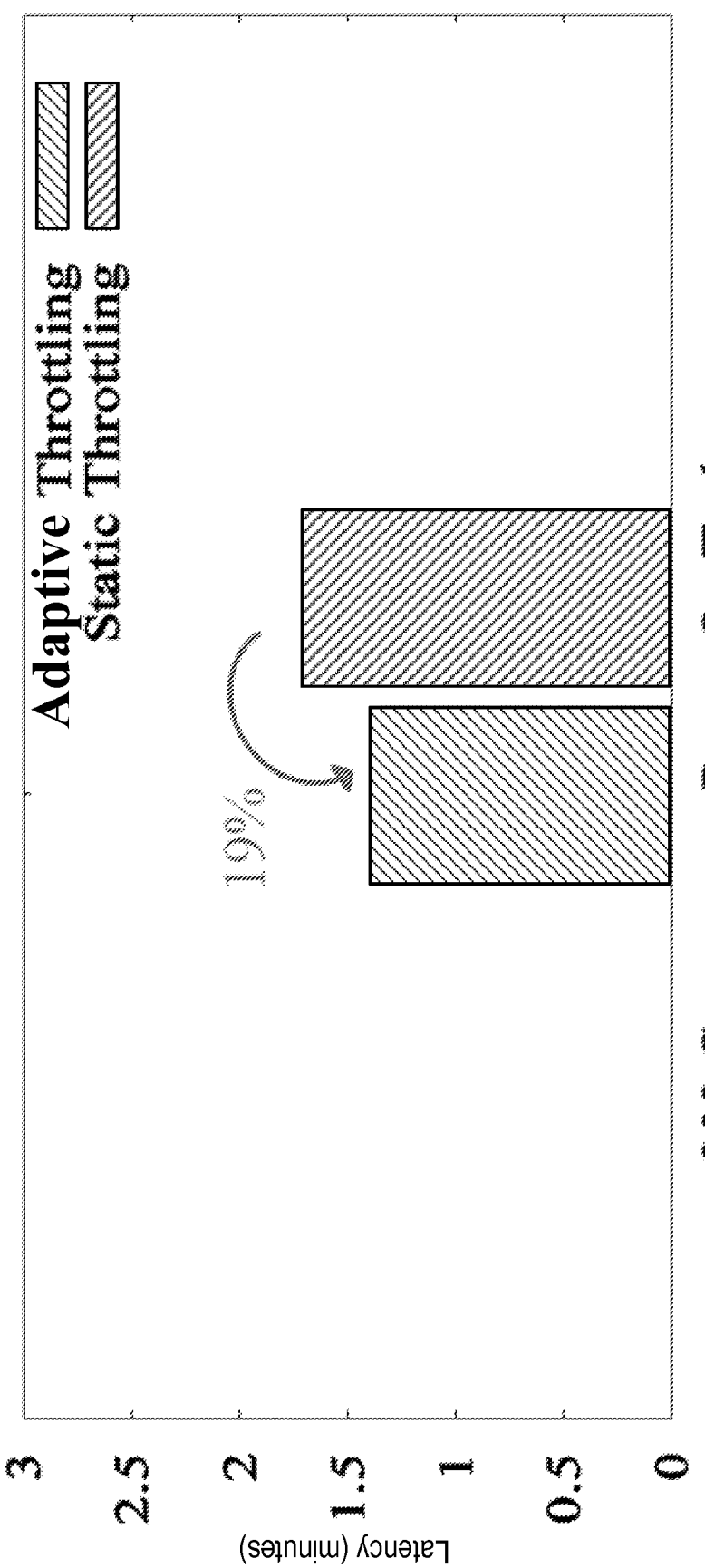
FIG. 22 is a bar chart comparing the latency from static throttling of 200 power-on tasks versus adaptive throttling of the 200 power-on tasks using the exemplary methods illustrated in FIG. 4 and FIG. 5.
Figure 23:
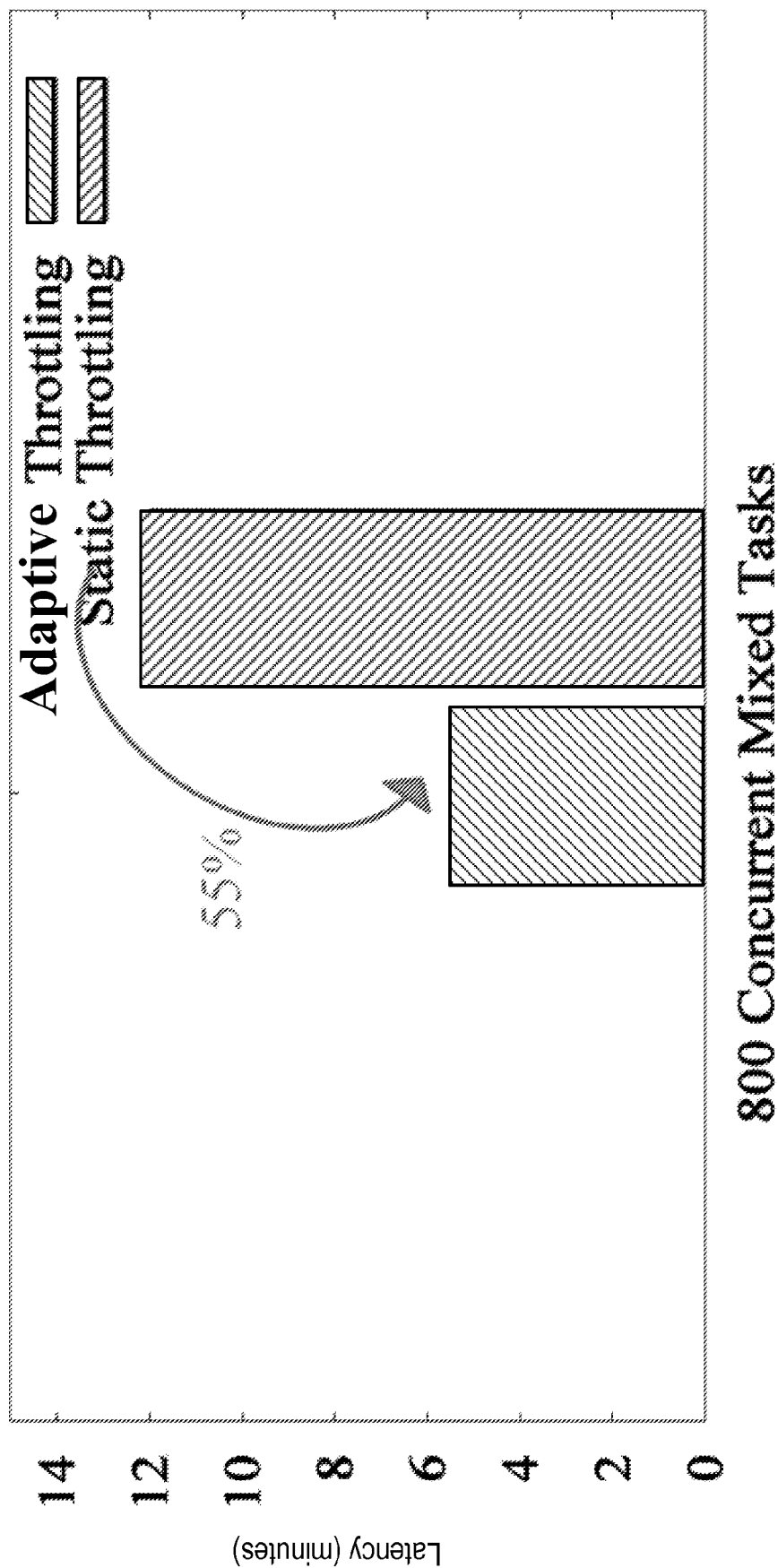
FIG. 23 is a bar chart comparing the latency from static throttling of 800 mixed operation tasks versus adaptive throttling of the 800 mixed operation tasks using the exemplary methods illustrated in FIG. 4 and FIG. 5.

FIG. 21 is a bar chart comparing the latency from static throttling of memory reconfiguration tasks versus adaptive throttling of memory reconfiguration tasks using the exemplary methods illustrated in FIG. 4 and FIG. 5. FIG. 22 is a bar chart comparing the latency from static throttling 200 power-on tasks versus adaptive throttling the 200 power-on tasks using the exemplary methods illustrated in FIG. 4 and FIG. 5. FIG. 23 is a bar chart comparing the latency from static throttling of 800 mixed operation tasks versus adaptive throttling of the 800 mixed operation tasks using the exemplary methods illustrated in FIG. 4 and FIG. 5.

FIG. 21, FIG. 22, and FIG. 23 compare the end-to-end workload completion times per the data shown in Table 1 below. The optimal static throttling case represents the best static threshold derived from an offline analysis of workload. The naïve static case represents the threshold used for the static throttling experiments described above.

TABLE 1

End-to-End Latency Comparison (minutes).

| Operation Type | Naive Static | Optimal Static | Adaptive Throttling |
| --- | --- | --- | --- |
| memory reconfig | 2.45 | 1.56 | 1.67 |
| powerOn | 1.70 | 1.35 | 1.39 |
| mixed | 11.99 | 4.67 | 5.47 |

As shown in Table 1 above, the adaptive throttling approach, when compared with the naïve static approach, improves the end-to-end latency of the VM memory reconfiguration operations, VM power-on operations, and VM mixed operations by 32%, 19%, and 55%, respectively. This shows that the adaptive throttling approach is effective in adjusting to virtual datacenter 318 overload and therefore improves overall throughput.

The optimal static approach outperforms the adaptive throttling approach in these examples because the adaptive throttling approach takes time to find the local maxima (e.g., due to launching conservative quantities of tasks initially). With a larger operation set, the adaptive throttling approach performs even better.

Additional Examples

The following scenarios are merely exemplary and not intended to be limiting in any way.

In some scenarios, task management device 304 targets particular tasks towards particular domains within virtual datacenter 318, such as clusters or other groupings based on affinity of tasks. In this manner, aspects of the disclosure prevent busy domains from throttling other domains. For example, if Cluster A is overloaded with several boot storms, additional tasks to Cluster A are queued by task management device 304 to avoid cluster busy time. At the same time, tasks may not need to be queued for Cluster B which is idle. In this example, the performance feedback metrics from Cluster A do not need to be applied to Cluster B.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for iteratively determining an optimal token batch size to achieve optimal throughput in the datacenter.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for achieving maximal throughput in a virtual datacenter having dynamically changing resources, said system comprising:
    a memory area associated with a task management device, said memory area storing a plurality of outstanding tasks to be performed by a plurality of virtual machines (VMs) executing in the virtual datacenter; and
    a processor programmed to:
        normalize the outstanding tasks stored in the memory area by assigning a quantity of tokens to each of the outstanding tasks, the tokens representing an amount of work performed by the virtual datacenter when performing the outstanding tasks, the assigned quantity of tokens representing a second token batch size;
        measure, by the task management device, a first throughput at a first token batch size and a second throughput at the second token batch size;
        calculate, by the task management device, a rate of change between the measured first throughput at the first token batch size and the measured second throughput at the second token batch size; and
        identify an output token batch size, the output token batch size representing another set of outstanding tasks to be performed by the virtual datacenter in a next round of processing, identifying the output token batch size comprises:
            if the calculated rate of change is negative, identify the output token batch size based on a combination of the first token batch size and the second token batch size; and
            otherwise, select, by the task management device, a third token batch size and repeat said measure, said calculate, and said identify using the second token batch size as the first token batch size and the third token batch size as the second token batch size during the repeating.

2. The system of claim 1, wherein the processor is further programmed to select a quantity of the normalized outstanding tasks, the selected quantity corresponding to the identified output token batch size.

3. The system of claim 1, wherein the tokens are used to determine an amount of resources consumed by the virtual datacenter when performing the outstanding tasks.

4. The system of claim 1, wherein the processor is further programmed to receive the plurality of outstanding tasks from a client device.

5. The system of claim 1, wherein the processor is programmed to normalize the outstanding tasks by assigning the quantity of tokens to each of the outstanding tasks based on the amount of resources to be consumed during performance of each of the outstanding tasks.

6. The system of claim 1, wherein the memory area further stores values, each value representing an amount of resources to be consumed by each of the tasks, and wherein the memory area further stores values representing an amount of resources available in the virtual datacenter.

7. The system of claim 6, wherein the processor is further programmed to update the values representing the amount of resources available in the virtual datacenter as resources are added and/or removed from the virtual datacenter.

8. The system of claim 1, wherein each of the plurality of outstanding tasks stored in the memory area is associated with a task type, each task type being associated with an amount of resources to be consumed.

9. A method for iteratively determining an optimal amount of work to be performed efficiently by a computing device, the method comprising:
    measuring, by a task management device, a first throughput at a first token batch size and a second throughput at a second token batch size, the first token batch size and the second token batch size each representing an amount of work performed by the computing device;
    calculating, by the task management device, a rate of change between the measured first throughput at the first token batch size and the measured second throughput at the second token batch size;
    selecting, by the task management device, a third token batch size based on the calculated rate of change;
    providing a quantity of tasks corresponding to the selected third token batch size to the computing device for processing; and
    repeating said measuring, said calculating, said selecting, said providing, and said repeating using the second token batch size as the first token batch size and the third token batch size as the second token batch size during said repeating.

10. The method of claim 9, wherein calculating the rate of change comprises calculating a gradient.

11. The method of claim 10, wherein selecting the third token batch size comprises selecting the third token batch size based on the calculated gradient.

12. The method of claim 9, wherein if the calculated rate of change is negative, further comprising throttling the amount of work performed by the computing device.

13. The method of claim 12, wherein throttling the amount of work comprises reducing the quantity of tasks to be performed by rejecting and/or queuing one or more of the tasks.

14. The method of claim 9, wherein measuring the second throughput at the second token batch size comprises measuring the second throughput at a second token batch size selected based on a quantity of outstanding tasks to be performed by the computing device.

15. One or more computer-readable storage media including computer-executable instructions that, when executed, cause at least one processor to intermittently identify maximal throughput in an environment having dynamically changing resources by:
  measuring, by a task management device, a first throughput at a first token batch size and a second throughput at a second token batch size, tokens in the first token batch size and the second token batch size representing an amount of work performed by a computing device;
  calculating, by the task management device, a rate of change between the measured first throughput at the first token batch size and the measured second throughput at the second token batch size; and
  identifying an output token batch size, the output token batch size representing another set of outstanding tasks to be performed by the computing device in a next round of processing, identifying the output token batch size comprises:
    if the calculated rate of change is negative, identify the output token batch size by allocating a quantity of tokens to outstanding tasks to be performed by the computing device, the output token batch size including the tokens allocated to the outstanding tasks, and the quantity of tokens allocated to the outstanding tasks being based on the first token batch size; and
    otherwise, selecting, by the task management device, a third token batch size and repeating said measuring, said calculating, and said identifying using the second token batch size as the first token batch size and the third token batch size as the second token batch size during said repeating.

16. The computer storage media of claim 15, wherein the computer-executable instructions further cause the processor to normalize the outstanding tasks by weighting each of the outstanding tasks based on anticipated resource usage during performance of the outstanding task.

17. The computer storage media of claim 16, wherein the computer-executable instructions cause the processor to normalize the outstanding tasks by grouping the outstanding tasks into categories and dynamically weighting each of the categories.

18. The computer storage media of claim 16, wherein the computer-executable instructions cause the processor to normalize the outstanding tasks by associating a quantity of tokens with each of the outstanding tasks based on the anticipated resource usage during performance of the outstanding task.

* * * * *